(12) United States Patent
Glasco

(10) Patent No.: US 7,334,089 B2
(45) Date of Patent: *Feb. 19, 2008

(54) METHODS AND APPARATUS FOR PROVIDING CACHE STATE INFORMATION

(75) Inventor: David Brian Glasco, Austin, TX (US)

(73) Assignee: Newisys, Inc., Austin, TX (US)

( * ) Notice: Subject to any disclaimer, the term of this patent is extended or adjusted under 35 U.S.C. 154(b) by 322 days.

This patent is subject to a terminal disclaimer.

(21) Appl. No.: 10/442,845

(22) Filed: May 20, 2003

(65) Prior Publication Data

US 2004/0236912 A1  Nov. 25, 2004

(51) Int. Cl.
*G06F 12/00* (2006.01)
(52) U.S. Cl. ............... 711/143; 711/145; 711/144
(58) Field of Classification Search ............... None
See application file for complete search history.

(56) References Cited

U.S. PATENT DOCUMENTS

| | | | |
|---|---|---|---|
| 5,195,089 A | 3/1993 | Sindhu et al. | |
| 5,394,555 A | 2/1995 | Hunter et al. | |
| 5,524,212 A * | 6/1996 | Somani et al. | 711/121 |
| 5,692,123 A | 11/1997 | Logghe | |
| 5,751,995 A * | 5/1998 | Sarangdhar | 711/145 |
| 5,774,700 A | 6/1998 | Fisch et al. | |
| 5,829,032 A | 10/1998 | Komuro et al. | |
| 5,893,151 A * | 4/1999 | Merchant | 711/140 |
| 6,014,709 A * | 1/2000 | Gulick et al. | 709/235 |
| 6,018,791 A | 1/2000 | Arimilli et al. | |
| 6,038,652 A | 3/2000 | Phillips et al. | |
| 6,052,769 A | 4/2000 | Huff et al. | |
| 6,067,603 A | 5/2000 | Carpenter et al. | |
| 6,073,210 A | 6/2000 | Palanca et al. | |
| 6,085,295 A | 7/2000 | Ekanadham et al. | |
| 6,108,737 A | 8/2000 | Sharma et al. | 710/107 |
| 6,122,715 A | 9/2000 | Palanca et al. | |
| 6,148,378 A | 11/2000 | Bordaz et al. | |
| 6,167,492 A | 12/2000 | Keller et al. | 711/154 |
| 6,173,393 B1 | 1/2001 | Palanca et al. | |
| 6,189,078 B1 | 2/2001 | Bauman et al. | 711/156 |

(Continued)

FOREIGN PATENT DOCUMENTS

WO   WO0239242   5/2002

OTHER PUBLICATIONS

Multicast snooping: a new coherence method using a multicast address networkBilir, E.E.; Dickson, R.M.; Ying Hu; Plakal, M.; Sorin, D.J.; Hill, M.D.; Wood, D.A.;Computer Architecture, 1999. Proceedings of the 26th International Symposium on, May 2-4, 1999.*

(Continued)

*Primary Examiner*—Brian R. Peugh
(74) *Attorney, Agent, or Firm*—Beyer Weaver LLP

(57) ABSTRACT

According to the present invention, methods and apparatus are provided for increasing the efficiency of data access in a multiple processor, multiple cluster system. Mechanisms for allowing a variety of transactions to complete locally are implemented by providing remote data caches associated with the various clusters in the system. The remote data caches receive data and state information for memory lines held in remote clusters. State information is provided to the remote data cache using various mechanisms including a coherence directory and augmented source done messages.

37 Claims, 18 Drawing Sheets

U.S. PATENT DOCUMENTS

| | | | |
|---|---|---|---|
| 6,192,451 B1 | 2/2001 | Arimilli et al. | |
| 6,205,520 B1 | 3/2001 | Palanca et al. | |
| 6,209,055 B1 | 3/2001 | Durham et al. | |
| 6,209,065 B1 | 3/2001 | Van Doren et al. | |
| 6,292,705 B1 | 9/2001 | Wang et al. | |
| 6,292,906 B1 | 9/2001 | Fu et al. | |
| 6,330,643 B1 | 12/2001 | Arimilli et al. | |
| 6,334,172 B1 | 12/2001 | Arimilli et al. | |
| 6,338,122 B1 | 1/2002 | Baumgartne et al. | |
| 6,343,347 B1 | 1/2002 | Arimilli et al. | |
| 6,385,705 B1 | 5/2002 | Keller et al. | 711/154 |
| 6,405,289 B1 | 6/2002 | Arimilli et al. | |
| 6,463,529 B1 | 10/2002 | Miller et al. | |
| 6,467,007 B1 | 10/2002 | Armstrong et al. | |
| 6,490,661 B1 | 12/2002 | Keller et al. | 711/150 |
| 6,542,926 B2 | 4/2003 | Zalewski et al. | |
| 6,615,319 B2 | 9/2003 | Khare et al. | |
| 6,631,447 B1 | 10/2003 | Morioka et al. | |
| 6,633,945 B1 | 10/2003 | Fu et al. | |
| 6,633,960 B1 | 10/2003 | Kessler et al. | |
| 6,636,906 B1* | 10/2003 | Sharma et al. | 710/22 |
| 6,640,287 B2 | 10/2003 | Gharachorloo et al. | |
| 6,658,526 B2 | 12/2003 | Nguyen et al. | |
| 6,665,767 B1 | 12/2003 | Comisky et al. | |
| 6,704,842 B1 | 3/2004 | Janakiraman et al. | |
| 6,738,870 B2 | 5/2004 | Van Huben et al. | |
| 6,738,871 B2 | 5/2004 | Van Huben et al. | |
| 6,751,698 B1 | 6/2004 | Deneroff et al. | |
| 6,751,721 B1 | 6/2004 | Webb, Jr. et al. | |
| 6,754,782 B2 | 6/2004 | Arimilli et al. | |
| 6,760,809 B2 | 7/2004 | Arimilli et al. | |
| 6,760,819 B2 | 7/2004 | Dhong et al. | |
| 6,799,252 B1* | 9/2004 | Bauman | 711/149 |
| 6,865,595 B2 | 3/2005 | Glasco | |
| 6,892,282 B2 | 5/2005 | Hass et al. | |
| 6,918,014 B1* | 7/2005 | Borrill | 711/147 |
| 6,920,532 B2* | 7/2005 | Glasco et al. | 711/141 |
| 7,003,633 B2 | 2/2006 | Glasco | |
| 7,024,521 B2* | 4/2006 | Glasco | 711/145 |
| 7,103,726 B2 | 9/2006 | Glasco | |
| 7,162,589 B2 | 1/2007 | Glasco et al. | |
| 2001/0013089 A1 | 8/2001 | Weber et al. | |
| 2001/0037435 A1 | 11/2001 | Van Doren | |
| 2002/0007463 A1 | 1/2002 | Fung | |
| 2002/0046327 A1 | 4/2002 | Gharachorloo et al. | |
| 2002/0052914 A1 | 5/2002 | Zalewski et al. | |
| 2002/0083149 A1 | 6/2002 | Van Huben et al. | |
| 2002/0083243 A1 | 6/2002 | Van Huben et al. | |
| 2002/0087807 A1* | 7/2002 | Gharachorloo et al. | 711/141 |
| 2002/0087811 A1 | 7/2002 | Khare et al. | |
| 2003/0009623 A1 | 1/2003 | Arimilli et al. | |
| 2003/0182508 A1 | 9/2003 | Glasco | |
| 2003/0182509 A1 | 9/2003 | Glasco | |
| 2003/0182514 A1 | 9/2003 | Glasco | |
| 2003/0195939 A1 | 10/2003 | Edirisooriya et al. | |
| 2003/0196047 A1 | 10/2003 | Kessler et al. | |
| 2003/0210655 A1 | 11/2003 | Glasco | |
| 2003/0212741 A1 | 11/2003 | Glasco | |
| 2003/0233388 A1 | 12/2003 | Glasco et al. | |
| 2004/0073755 A1 | 4/2004 | Webb et al. | |
| 2004/0088493 A1 | 5/2004 | Glasco | |
| 2004/0088494 A1 | 5/2004 | Glasco et al. | |
| 2004/0123045 A1* | 6/2004 | Hum et al. | 711/141 |
| 2004/0255002 A1 | 12/2004 | Kota et al. | |
| 2005/0251626 A1* | 11/2005 | Glasco | 711/133 |

OTHER PUBLICATIONS

Bandwidth adaptive snoopingMartin, M.M.K.; Sorin, D.J.; Hill, M.D.; Wood, D.A.; High-Performance Computer Architecture, 2002. Proceedings. Eighth International Symposium on , Feb. 2-6, 2002; pp. 251-262.*

Specifying and verifying a broadcast and a multicast snooping cache coherence protocolSorin, D.J.; Plakal, M.; Condon, A.E.; Hill, M.D.; Martin, M.M.K.; Wood, D.A.;Parallel and Distributed Systems, IEEE Transactions on, vol. 13, Issue: Jun. 6, 2002.*

HyperTransport™ I/O Link Specification Revision 1.03, HyperTransport™ Consortium, Oct. 10, 2001, Copyright © 2001 HyperTransport Technology Consortium.

PCT Application No. PCT/US04/16111, Int'l filing date May 20, 2004, PCT Search report mailed Mar. 4, 2005.

PCT Application No. PCT/US04/16111, Int'l filing date May 20, 2004, PCT Written Opinion mailed Mar. 4, 2005 with search report.

Office Action dated Oct. 5, 2005, from related application No. 10/635,703.

Multicast snooping; a new coherence method using a multicast address network Bilir, E.E.; Dickson, R.M.; Ying Hu; Plakal, M.; Sorin, D.J.; Hill, M.D.; Wood, D.A.; Wood, D.A.; Computer Architecture, 1999. Proceedings of the 26th International Symposium on, May 2-4, 1999.

Bandwidth adaptive snooping Martin, M.M.K.; Sorin, D.J.; Hill, M.D.; Wood, D.A.; High-Performance Computer Architecture, 2002. Proceedings. Eighth International Symposium on , Feb. 2-6, 2002; pp. 251-262.

Specifying and verifying a broadcast and a multicast snooping cache coherence protocol Sorin, D.J.; Plakal, M.; Condon, A.E.; Hill, M.D.; Martin, M.M.K.; Wood, D.A.; Parallel and Distributed Systems, IEEE Transactions on , vol.: 13 , Issue: 6 , Jun. 2002.

Kim, et al., "Power-aware Partitioned Cache Architectures", COPYRGT. 2001 ACM, p. 6467.

Powell, et al., "Reducing Set-Associative Cache Energy via Way-Prediction and Selective Direct-Mapping", COPYRGT. 2001 IEEE, pp. 54-65.

PCT Search Report PCT/US03/34756, Int'l filing date Oct. 30, 2003, Search report Mailed Dec. 16, 2004.

U.S. Office Action mailed Sep. 22, 2004, from related U.S. Appl. No. 10/106,426.

U.S. Office Action mailed Mar. 7, 2005, from related U.S. Appl. No. 10/106,426.

U.S. Office Action mailed Jul. 21, 2005, from related U.S. Appl. No. 10/106,426.

U.S. Office Action mailed Sep. 23, 2004, from related U.S. Appl. No. 10/106,430.

U.S. Office Action mailed Mar. 10, 2005, from related U.S. Appl. No. 10/106,430.

U.S. Office Action mailed Jul. 25, 2005, from related U.S. Appl. No. 10/106,430.

U.S. Office Action mailed Sep. 22, 2004, from related U.S. Appl. No. 10/106,299.

U.S. Office Action mailed Mar. 10, 2005, from related U.S. Appl. No. 10/106,299.

U.S. Office Action mailed Jul. 21, 2005, from related U.S. Appl. No. 10/106,299.

D. E. Culler, J. P. Singh, A. Gupta, "Parallel Computer Architecture", 1999 Morgan Kaufmann, San Francisco, Ca USA XP002277658.

Andrew Tanenbaum, "Computer Networks", Computer Networks, London: London: Prentice Hall International, GB, 1996, pp. 345-403, XP002155220.

U.S. Office Action mailed Jul. 20, 2005, from related U.S. Appl. No. 10/608,846.

U.S. Office Action mailed Sep. 9, 2005, from related U.S. Appl. No. 10/462,015.

U.S. Office Action mailed Sep. 9, 2005, from related U.S. Appl. No. 10/426,084.

U.S. Office Action mailed Nov. 2, 2005, from related U.S. Appl. No. 10/106,430.

U.S. Office Action mailed Jan. 4, 2006, from related U.S. Appl. No. 10/442,845.

U.S. Office Action mailed Oct. 20, 2005, from related U.S. Appl. No. 10/321,078.

Office Action, U.S. Appl. No: 10/288,399, mailed Nov. 18, 2004.

Final Office Action, U.S. Appl. No: 10/288,399, mailed May 24, 2005.

Office Action, U.S. Appl. No: 10/288,399, mailed Sep. 20, 2005.

Office Action, U.S. Appl. No: 10/288,347, mailed Nov. 18, 2004.

Final Office Action, U.S. Appl. No: 10/288,347, mailed May 12, 2005.

* cited by examiner

Figure 7

| Coherence Directory 701 | | | |
|---|---|---|---|
| Memory Line 711 | State 713 | Dirty Data Owner 715 | Occupancy Vector 717 |
| Address 721 | Invalid | N/A | N/A |
| Address 731 | Invalid | N/A | N/A |
| Address 741 | Shared | N/A | Clusters 1,3 |
| Address 751 | Shared | N/A | Clusters 1, 2, 3, 4 |
| Address 761 | Owned | Cluster 4 | Cluster 2, 3, 4 |
| Address 771 | Owned | Cluster 2 | Cluster 2, 4 |
| Address 781 | Modified | Cluster 2 | N/A |
| Address 791 | Modified | Cluster 3 | N/A |
| ... | ... | ... | ... |

Figure 8

| Remote Data Cache 801 | | |
|---|---|---|
| Memory Line 811 | State 813 | Cached Data 815 |
| Address 821 | Invalid | N/A |
| Address 831 | Pending | Data 833 |
| Address 841 | Shared | Data 843 |
| Address 851 | Shared | Data 853 |
| Address 861 | Owned | Data 863 |
| Address 871 | Owned | Data 873 |
| Address 881 | Pending | Data 883 |
| Address 891 | Shared | Data 893 |
| ... | ... | ... |

METHODS AND APPARATUS FOR PROVIDING CACHE STATE INFORMATION

CROSS-REFERENCE TO RELATED APPLICATIONS

The present application is related to filed U.S. patent application Ser. No. 10/288,347 now U.S. Pat. No. 7,003,633, and Ser. No. 10/288,399, now U.S. Pat. No. 7,103,726, both titled Methods And Apparatus For Managing Probe Requests by David B. Glasco and filed on Nov. 4, 2002, the entireties of which are incorporated by reference herein for all purposes.

BACKGROUND OF THE INVENTION

1. Field of the Invention

The present invention generally relates to accessing data in a multiple processor system. More specifically, the present invention provides techniques for improving data access efficiency while maintaining cache coherency in a multiple processor system having a multiple cluster architecture.

2. Description of Related Art

Performance limitations have led to the development of a point-to-point architecture for connecting processors in a system with a single memory space. In one example, individual processors can be directly connected to each other through a plurality of point-to-point links to form a cluster of processors. Separate clusters of processors can also be connected. The point-to-point links significantly increase the bandwidth for coprocessing and multiprocessing functions.

In such a multiple processor, multiple cluster system, processors send probe requests in order to perform operations on particular memory lines that may be cached in local or remote nodes. Some common operations include read block, read block shared, and read block modified operations on memory lines. In many examples, transactions are forwarded to remote clusters even when transactions could be handled locally if additional mechanisms were provided. However, mechanisms for handling transactions locally are limited.

Consequently, it is desirable to provide techniques for improving cache access request efficiency in systems having multiple clusters of multiple processors connected using point-to-point links.

SUMMARY OF THE INVENTION

According to the present invention, methods and apparatus are provided for increasing the efficiency of data access in a multiple processor, multiple cluster system. Mechanisms for allowing a variety of transactions to complete locally are implemented by providing remote data caches associated with the various clusters in the system. The remote data caches receive data and state information for memory lines held in remote clusters. State information is provided to the remote data cache using various mechanisms including a coherence directory and augmented source done messages.

In one embodiment, a computer system is provided. The computer system includes a request cluster and a home cluster. The request cluster includes a first plurality of nodes and a request cache coherence controller. The first plurality of nodes have a first plurality of processors and a first plurality of caches associated with the first plurality of processors. The request cache coherence controller is associated with a remote data cache. The remote data cache holds data in memory lines of nonrequest clusters. A home cluster includes a second plurality of processors and a request cache coherence controller. The second plurality of processors are interconnected in a point-to-point architecture In another embodiment, a method for maintaining coherency is provided. A write back is received at a request cache coherence controller from a request cluster processor. The write back is associated with a memory line evicted from a cache corresponding to the request cluster processor. Data associated with the memory line is written into a remote data cache. The remote data cache holds data in memory lines in the address space of non-request clusters. Information indicating whether the memory line was held in the modified or owned state is received.

In another embodiment, a method for maintaining coherency is provided. A read block response is received at a request cache coherence controller from a home cluster. The read block response is associated with a memory line. Data associated with the read block response is written into a remote data cache. The remote data cache holds data in memory lines in the address space of non-request clusters.

In yet another embodiment, a computer system includes a request cluster and a home cluster. A request cluster includes a first plurality of nodes and a request cache coherence controller. The first plurality of nodes have a first plurality of processors and a first plurality of caches associated with the first plurality of processors. The request cache coherence controller is associated with a remote data cache. The remote data cache holds data in memory lines of nonrequest clusters. A home cluster includes a second plurality of processors and a request cache coherence controller. The second plurality of processors are interconnected in a point-to-point architecture. The first plurality of processors are operable to send information to the request cache coherence controller indicating whether a cache line is owned or modified in order to modify an entry in the remote data cache.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIG. 7 is a diagrammatic representation showing a cache coherence directory.

FIG. 8 is a diagrammatic representation showing a remote data cache.

DETAILED DESCRIPTION OF SPECIFIC EMBODIMENTS

Figure 1A:
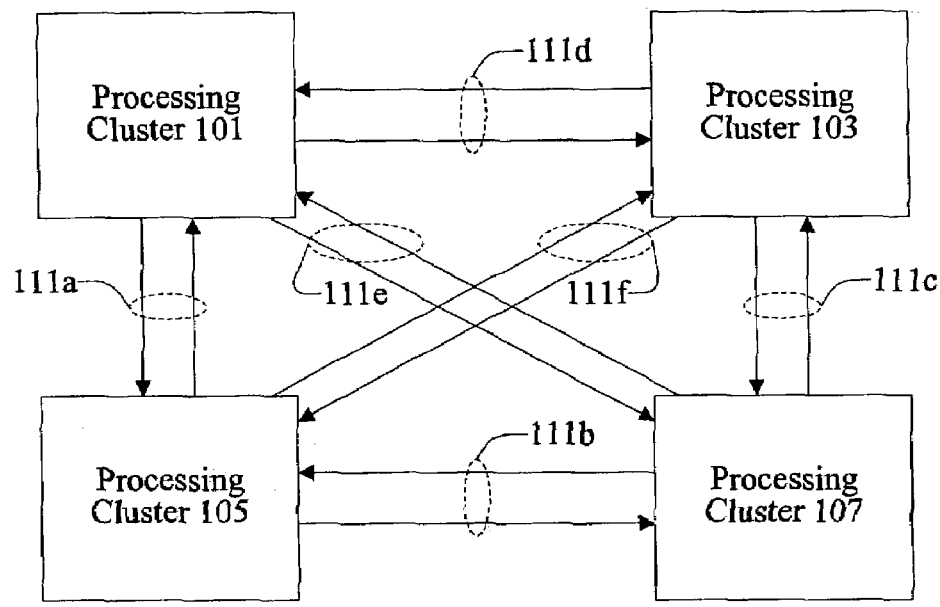
FIGS. 1A and 1B are diagrammatic representation depicting a system having multiple clusters.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Multi-processor architectures having point-to-point communication among their processors are suitable for implementing specific embodiments of the present invention. In the following description, numerous specific details are set forth in order to provide a thorough understanding of the present invention. The present invention may be practiced without some or all of these specific details. Well-known process operations have not been described in detail in order not to unnecessarily obscure the present invention. Furthermore, the present application's reference to a particular singular entity includes that possibility that the methods and apparatus of the present invention can be implemented using more than one entity, unless the context clearly dictates otherwise.

Techniques are provided for increasing data access efficiency in a multiple processor, multiple cluster system. In a point-to-point architecture, a cluster of processors includes multiple processors directly connected to each other through point-to-point links. By using point-to-point links instead of a conventional shared bus or external network, multiple processors are used efficiently in a system sharing the same memory space. Processing and network efficiency are also improved by avoiding many of the bandwidth and latency limitations of conventional bus and external network based multiprocessor architectures. According to various embodiments, however, linearly increasing the number of processors in a point-to-point architecture leads to an exponential increase in the number of links used to connect the multiple processors. In order to reduce the number of links used and to further modularize a multiprocessor system using a point-to-point architecture, multiple clusters are used.

According to various embodiments, the multiple processor clusters are interconnected using a point-to-point architecture. Each cluster of processors includes a cache coherence controller used to handle communications between clusters. In one embodiment, the point-to-point architecture used to connect processors are used to connect clusters as well.

By using a cache coherence controller, multiple cluster systems can be built using processors that may not necessarily support multiple clusters. Such a multiple cluster system can be built by using a cache coherence controller to represent non-local nodes in local transactions so that local nodes do not need to be aware of the existence of nodes outside of the local cluster. More detail on the cache coherence controller will be provided below.

In a single cluster system, cache coherency can be maintained by sending all data access requests through a serialization point. Any mechanism for ordering data access requests is referred to herein as a serialization point. One example of a serialization point is a memory controller. Various processors in the single cluster system send data access requests to the memory controller. In one example, the memory controller is configured to serialize or lock the data access requests so that only one data access request for a given memory line is allowed at any particular time. If another processor attempts to access the same memory line, the data access attempt is blocked until the memory line is unlocked. The memory controller allows cache coherency to be maintained in a multiple processor, single cluster system.

A serialization point can also be used in a multiple processor, multiple cluster system where the processors in the various clusters share a single address space. By using a single address space, internal point-to-point links can be used to significantly improve intercluster communication over traditional external network based multiple cluster systems. Various processors in various clusters send data access requests to a memory controller associated with a particular cluster such as a home cluster. The memory controller can similarly serialize all data requests from the different clusters. However, a serialization point in a multiple processor, multiple cluster system may not be as efficient as a serialization point in a multiple processor, single cluster system. That is, delay resulting from factors such as latency from transmitting between clusters can adversely affect the response times for various data access requests. It should be noted that delay also results from the use of probes in a multiple processor environment.

Although delay in intercluster transactions in an architecture using a shared memory space is significantly less than the delay in conventional message passing environments using external networks such as Ethernet or Token Ring, even minimal delay is a significant factor. In some applications, there may be millions of data access requests from a processor in a fraction of a second. Any delay can adversely impact processor performance.

According to various embodiments, probe management is used to increase the efficiency of accessing data in a multiple processor, multiple cluster system. A mechanism for eliciting a response from a node to maintain cache coherency in a system is referred to herein as a probe. In one example, a mechanism for snooping a cache is referred to as a probe. A response to a probe can be directed to the source or target of the initiating request. Any mechanism for filtering or reducing the number of probes and probe requests transmitted to various nodes is referred to herein as managing probes. In one example, managing probe entails characterizing a probe request to determine if a probe can be transmitted to a reduced number of entities.

In typical implementations, requests are sent to a memory controller that broadcasts probes to various nodes in a system. In such a system, no knowledge of the cache line state is known. All nodes in the system are probed and the request cluster receives a response from each node. In a system with a coherence directory, state information associated with various memory lines can be used to reduce the number of transactions. Any mechanism for maintaining state information associated with various memory lines is referred to herein as a coherence directory. A coherence directory typically includes information for memory lines in a local cluster that are cached in a remote cluster. According to various embodiments, a coherence directory is used to reduce the number of probes to remote clusters by inferring the state of local caches. In other embodiments, a coherence directory is used to eliminate the transmission of a request to a memory controller in a home cluster.

FIG. 1A is a diagrammatic representation of one example of a multiple cluster, multiple processor system that can use the techniques of the present invention. Each processing cluster 101, 103, 105, and 107 can include a plurality of processors. The processing clusters 101, 103, 105, and 107 are connected to each other through point-to-point links 111a-f. In one embodiment, the multiple processors in the multiple cluster architecture shown in FIG. 1A share the same memory space. In this example, the point-to-point links 111a-f are internal system connections that are used in place of a traditional front-side bus to connect the multiple processors in the multiple clusters 101, 103, 105, and 107. The point-to-point links may support any point-to-point coherence protocol.

Figure 1B:
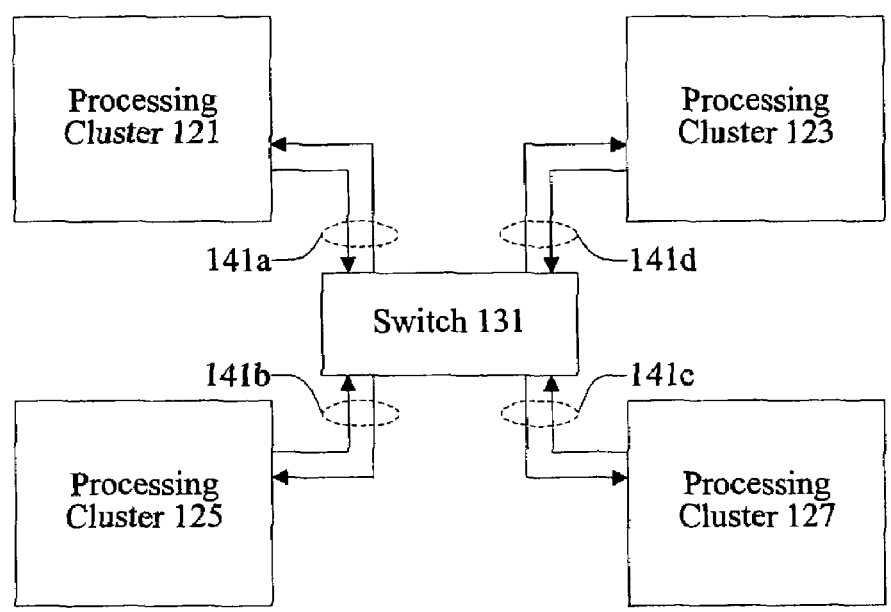

FIG. 1B is a diagrammatic representation of another example of a multiple cluster, multiple processor system that can use the techniques of the present invention. Each processing cluster 121, 123, 125, and 127 can be coupled to a switch 131 through point-to-point links 141a-d. It should be noted that using a switch and point-to-point links allows implementation with fewer point-to-point links when connecting multiple clusters in the system. A switch 131 can include a processor with a coherence protocol interface. According to various implementations, a multicluster system shown in FIG. 1A is expanded using a switch 131 as shown in FIG. 1B.

Figure 2:
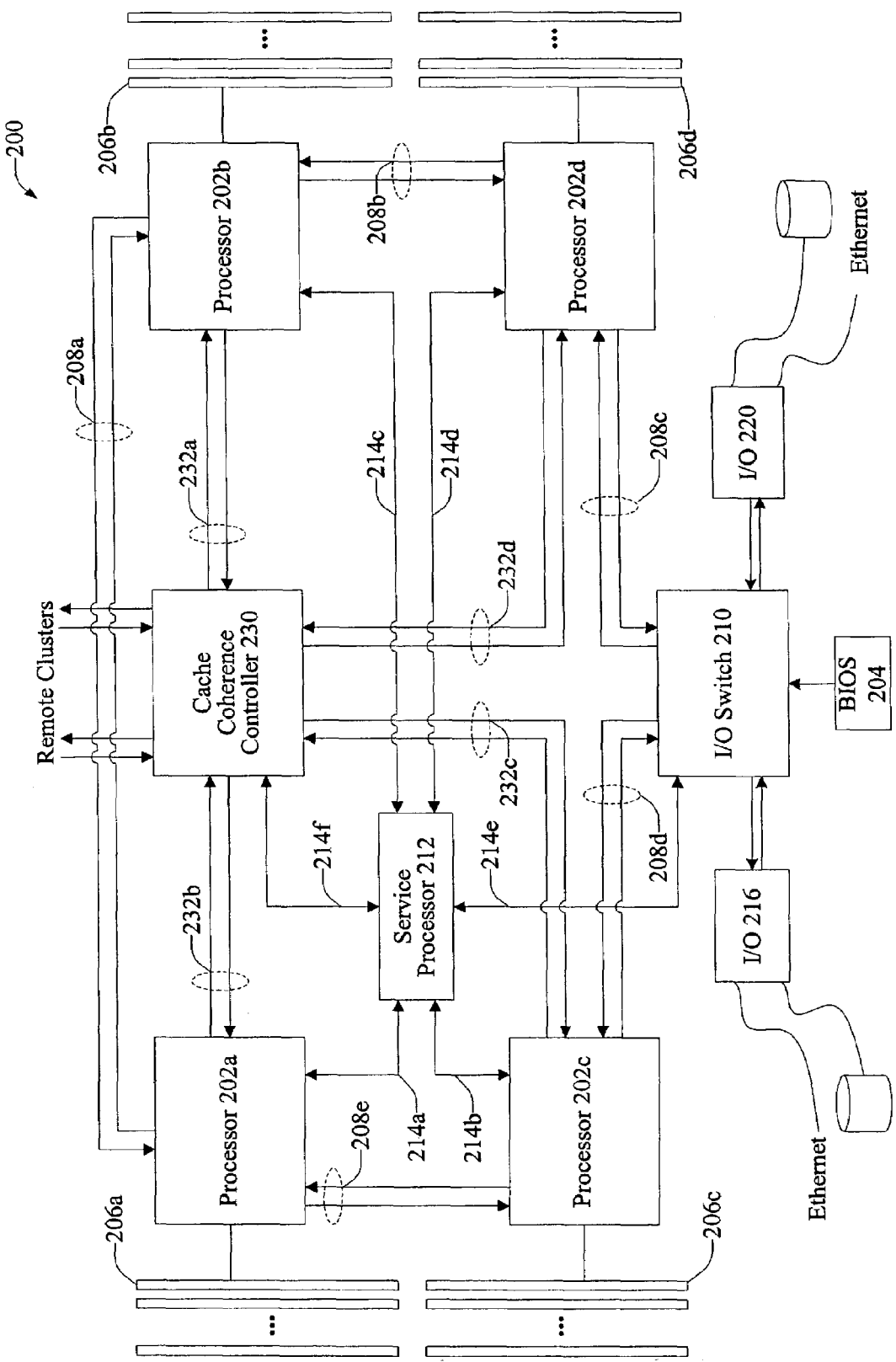
FIG. 2 is a diagrammatic representation of a cluster having a plurality of processors.

FIG. 2 is a diagrammatic representation of a multiple processor cluster, such as the cluster 101 shown in FIG. 1A. Cluster 200 includes processors 202a-202d, one or more Basic I/O systems (BIOS) 204, a memory subsystem comprising memory banks 206a-206d, point-to-point communication links 208a-208e, and a service processor 212. The point-to-point communication links are configured to allow interconnections between processors 202a-202d, I/O switch 210, and cache coherence controller 230. The service processor 212 is configured to allow communications with processors 202a-202d, I/O switch 210, and cache coherence controller 230 via a JTAG interface represented in FIG. 2 by links 214a-214f. It should be noted that other interfaces are supported. It should also be noted that in some implementations, a service processor is not included in multiple processor clusters. I/O switch 210 connects the rest of the system to I/O adapters 216 and 220.

According to specific embodiments, the service processor of the present invention has the intelligence to partition system resources according to a previously specified partitioning schema. The partitioning can be achieved through direct manipulation of routing tables associated with the system processors by the service processor which is made possible by the point-to-point communication infrastructure. The routing tables are used to control and isolate various system resources, the connections between which are defined therein.

The processors 202a-d are also coupled to a cache coherence controller 230 through point-to-point links 232a-d. Any mechanism or apparatus that can be used to provide communication between multiple processor clusters while maintaining cache coherence is referred to herein as a cache coherence controller. The cache coherence controller 230 can be coupled to cache coherence controllers associated with other multiprocessor clusters. It should be noted that there can be more than one cache coherence controller in one cluster. The cache coherence controller 230 communicates with both processors 202a-d as well as remote clusters using a point-to-point protocol.

More generally, it should be understood that the specific architecture shown in FIG. 2 is merely exemplary and that embodiments of the present invention are contemplated having different configurations and resource interconnections, and a variety of alternatives for each of the system resources shown. However, for purpose of illustration, specific details of server 200 will be assumed. For example, most of the resources shown in FIG. 2 are assumed to reside on a single electronic assembly. In addition, memory banks 206a-206d may comprise double data rate (DDR) memory which is physically provided as dual in-line memory modules (DIMMs). I/O adapter 216 may be, for example, an ultra direct memory access (UDMA) controller or a small computer system interface (SCSI) controller which provides access to a permanent storage device. I/O adapter 220 may be an Ethernet card adapted to provide communications with a network such as, for example, a local area network (LAN) or the Internet.

According to a specific embodiment and as shown in FIG. 2, both of I/O adapters 216 and 220 provide symmetric I/O access. That is, each provides access to equivalent sets of I/O. As will be understood, such a configuration would facilitate a partitioning scheme in which multiple partitions have access to the same types of I/O. However, it should also be understood that embodiments are envisioned in which partitions without I/O are created. For example, a partition including one or more processors and associated memory resources, i.e., a memory complex, could be created for the purpose of testing the memory complex.

According to one embodiment, service processor 212 is a Motorola MPC855T microprocessor which includes integrated chipset functions. The cache coherence controller 230 is an Application Specific Integrated Circuit (ASIC) supporting the local point-to-point coherence protocol. The cache coherence controller 230 can also be configured to handle a non-coherent protocol to allow communication with I/O devices. In one embodiment, the cache coherence controller 230 is a specially configured programmable chip such as a programmable logic device or a field programmable gate array.

Figure 3:
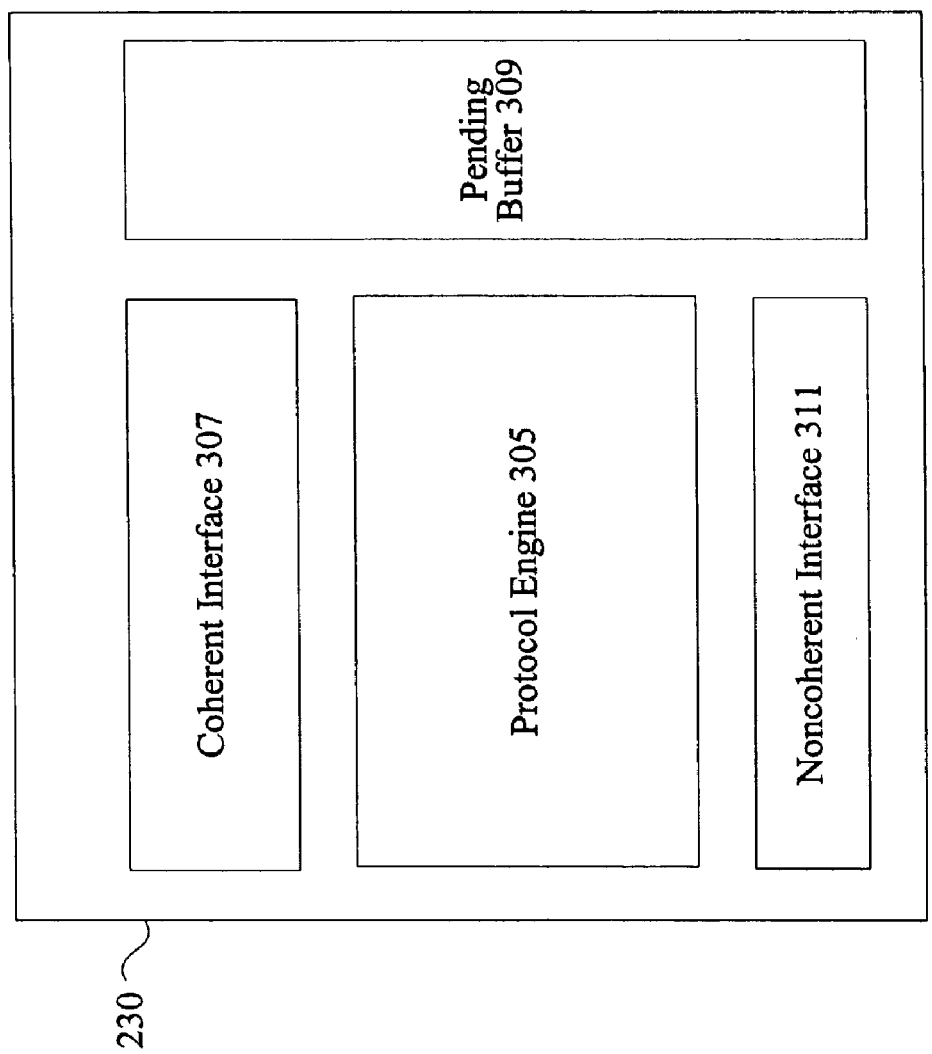
FIG. 3 is a diagrammatic representation of a cache coherence controller.

FIG. 3 is a diagrammatic representation of one example of a cache coherence controller 230. According to various embodiments, the cache coherence controller includes a protocol engine 305 configured to handle packets such as probes and requests received from processors in various clusters of a multiprocessor system. The functionality of the protocol engine 305 can be partitioned across several engines to improve performance. In one example, partitioning is done based on packet type (request, probe and response), direction (incoming and outgoing), or transaction flow (request flows, probe flows, etc).

The protocol engine 305 has access to a pending buffer 309 that allows the cache coherence controller to track transactions such as recent requests and probes and associate the transactions with specific processors. Transaction information maintained in the pending buffer 309 can include transaction destination nodes, the addresses of requests for subsequent collision detection and protocol optimizations, response information, tags, and state information.

The cache coherence controller has an interface such as a coherent protocol interface 307 that allows the cache coherence controller to communicate with other processors in the cluster as well as external processor clusters. According to various embodiments, each interface 307 and 311 is implemented either as a full crossbar or as separate receive and transmit units using components such as multiplexers and buffers. The cache coherence controller can also include other interfaces such as a non-coherent protocol interface 311 for communicating with I/O devices. It should be noted, however, that the cache coherence controller 230 does not necessarily need to provide both coherent and non-coherent interfaces. It should also be noted that a cache coherence controller in one cluster can communicate with a cache coherence controller in another cluster.

Figure 4:
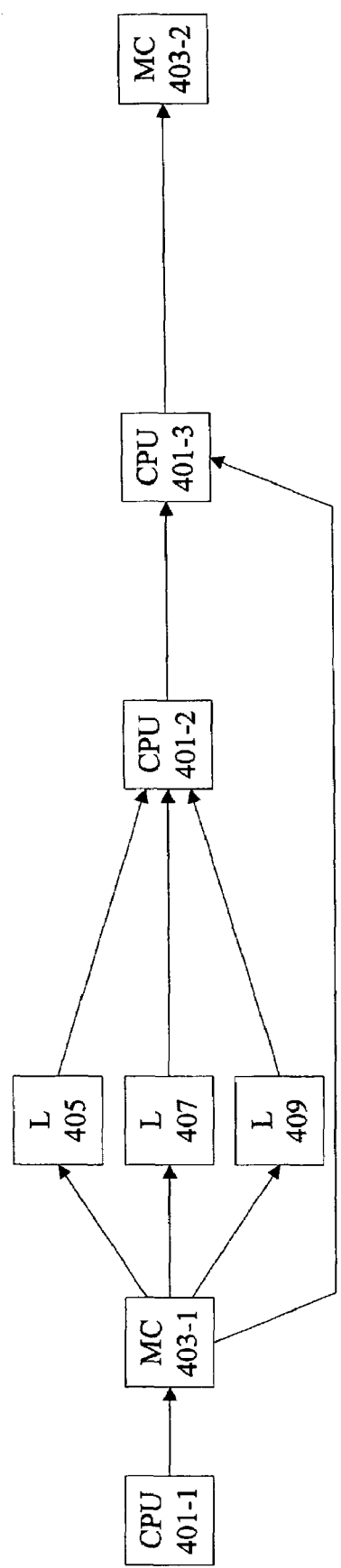
FIG. 4 is a diagrammatic representation showing a transaction flow for a data access request from a processor in a single cluster.

FIG. 4 is a diagrammatic representation showing the transactions for a cache request from a processor in a system having a single cluster without using a cache coherence controller. A processor 401-1 sends an access request such as a read memory line request to a memory controller 403-1. The memory controller 403-1 may be associated with this processor, another processor in the single cluster or may be a separate component such as an ASIC or specially configured Programmable Logic Device (PLD). To simplify cache coherence, only one processor is typically allowed to access a memory line corresponding to a shared address space at anyone given time. To prevent other processors from attempting to access the same memory line, the memory line can be locked by the memory controller 403-1. All other requests to the same memory line are blocked or queued. Access by another processor is typically only allowed when the memory controller 403-1 unlocks the memory line.

The memory controller 403-1 then sends probes to the local cache memories 405, 407, and 409 to determine cache states. The local cache memories 405, 407, and 409 then in turn send probe responses to the same processor 401-2. The memory controller 403-1 also sends an access response such as a read response to the same processor 401-3. The processor 401-3 can then send a done response to the memory controller 403-2 to allow the memory controller 403-2 to unlock the memory line for subsequent requests. It should be noted that CPU 401-1, CPU 401-2, and CPU 401-3 refer to the same processor.

FIGS. 5A-5D are diagrammatic representations depicting cache coherence controller operation. The use of a cache coherence controller in multiprocessor clusters allows the creation of a multiprocessor, multicluster coherent domain without affecting the functionality of local nodes such as processors and memory controllers in each cluster. In some instances, processors may only support a protocol that allows for a limited number of processors in a single cluster without allowing for multiple clusters. The cache coherence controller can be used to allow multiple clusters by making local processors believe that the non-local nodes are merely a single local node embodied in the cache coherence controller. In one example, the processors in a cluster do not need to be aware of processors in other clusters. Instead, the processors in the cluster communicate with the cache coherence controller as though the cache coherence controller were representing all non-local nodes.

It should be noted that nodes in a remote cluster will be referred to herein as non-local nodes or as remotes nodes. However, non-local nodes refer to nodes not in a request cluster generally and includes nodes in both a remote cluster and nodes in a home cluster. A cluster from which a data access or cache access request originates is referred to herein as a request cluster. A cluster containing a serialization point is referred to herein as a home cluster. Other clusters are referred to as remote clusters. The home cluster and the remote cluster are also referred to herein as non-local clusters.

Figure 5A:
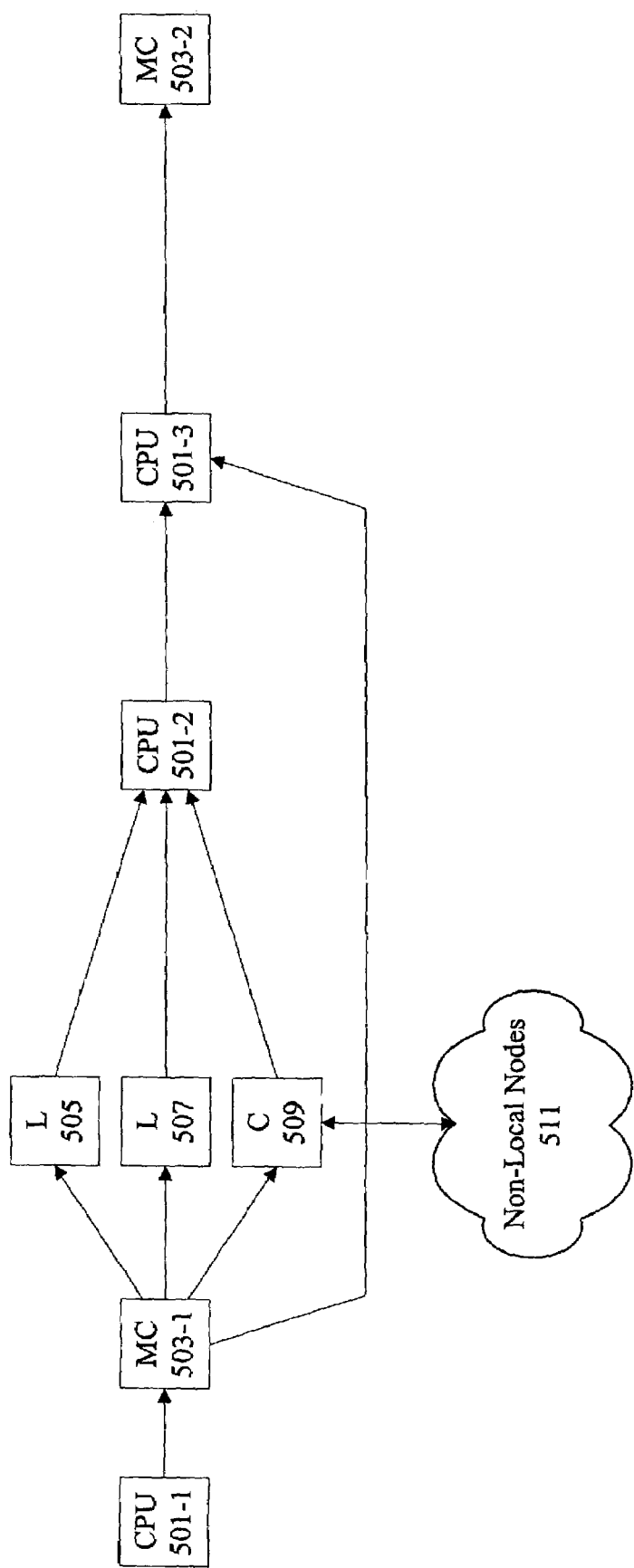
FIG. 5A-5D are diagrammatic representations showing cache coherence controller functionality.

FIG. 5A shows the cache coherence controller acting as an aggregate remote cache. When a processor 501-1 generates a data access request to a local memory controller 503-1, the cache coherence controller 509 accepts the probe from the local memory controller 503-1 and forwards it to non-local node portion 511. It should be noted that a coherence protocol can contain several types of messages. In one example, a coherence protocol includes four types of messages; data or cache access requests, probes, responses or probe responses, and data packets. Data or cache access requests usually target the home node memory controller. Probes are used to query each cache in the system. The probe packet can carry information that allows the caches to properly transition the cache state for a specified line. Responses are used to carry probe response information and to allow nodes to inform other nodes of the state of a given transaction. Data packets carry request data for both write requests and read responses.

According to various embodiments, the memory address resides at the local memory controller. As noted above, nodes including processors and cache coherence controllers outside of a local cluster are referred to herein as non-local nodes. The cache coherence controller 509 then accumulates the response from the non-local nodes and sends a single response in the same manner that local nodes associated with cache blocks 505 and 507 send a single response to processor 501-2. Local processors may expect a single probe response for every local node probed. The use of a cache coherence controller allows the local processors to operate without concern as to whether non-local nodes exist.

It should also be noted that components such as processor 501-1 and processor 501-2 refer herein to the same component at different points in time during a transaction sequence. For example, processor 501-1 can initiate a data access request and the same processor 501-2 can later receive probe responses resulting from the request.

Figure 5B:
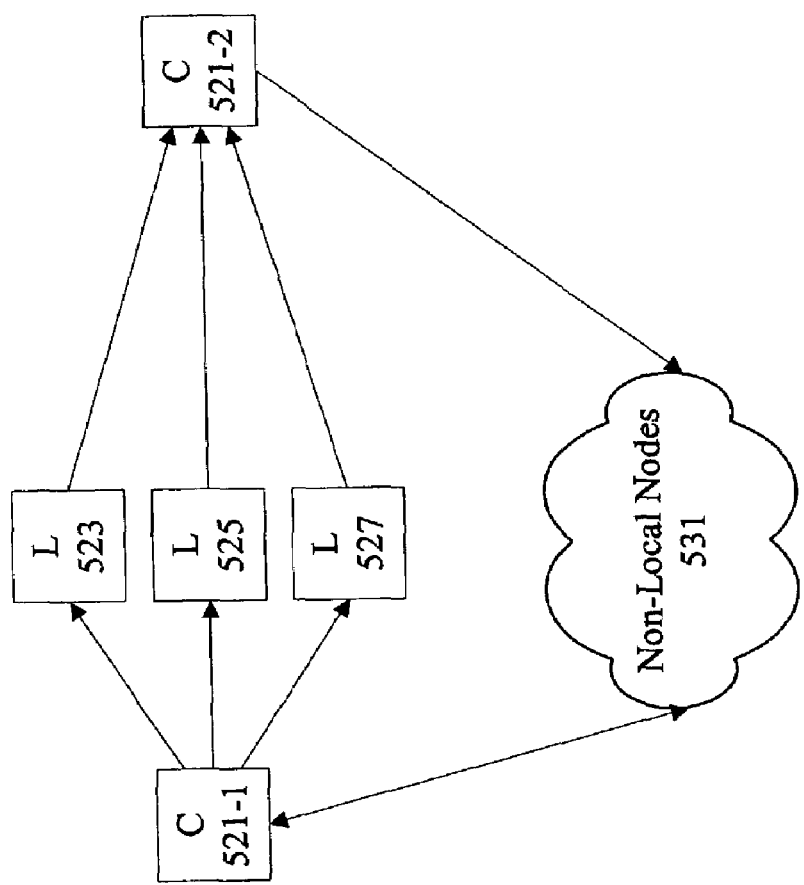

FIG. 5B shows the cache coherence controller acting as a probing agent pair. When the cache coherence controller 521-1 receives a probe from non-local nodes 531, the cache coherence controller 521-1 accepts the probe and forwards the probe to local nodes associated with cache blocks 523, 525, and 527. The cache coherence controller 521-2 then forwards a final response to the non-local node portion 531. In this example, the cache coherence controller is both the source and the destination of the probes. The local nodes associated with cache blocks 523, 525, and 527 behave as if the cache coherence controller were a local processor with a local memory request.

Figure 5C:
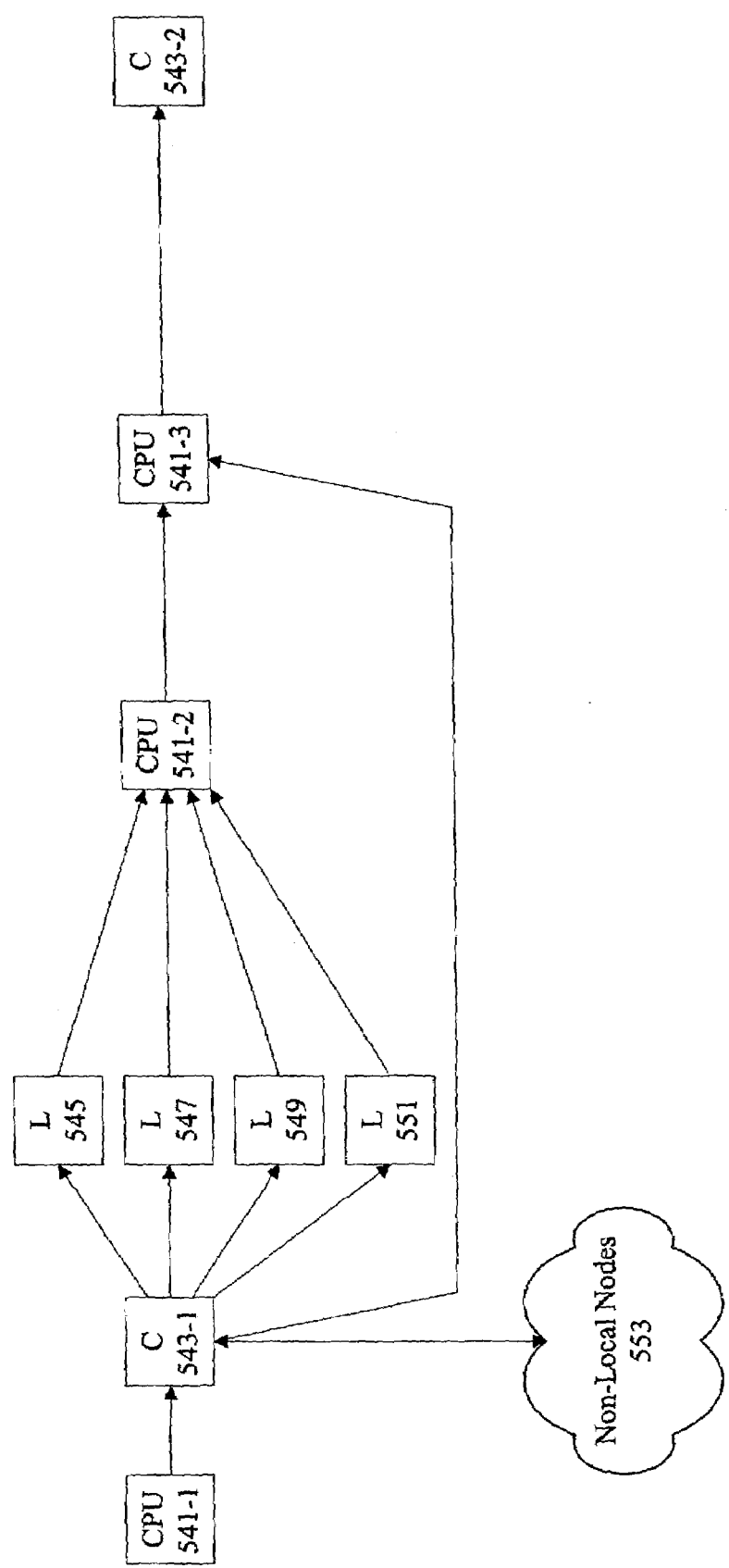

FIG. 5C shows the cache coherence controller acting as a remote memory. When a local processor 541-1 generates an access request that targets remote memory, the cache coherence controller 543-1 forwards the request to the non-local nodes 553. When the remote request specifies local probing, the cache coherence controller 543-1 generates probes to local nodes and the probed nodes provide responses to the processor 541-2. Once the cache coherence controller 543-1 has received data from the non-local node portion 553, it forwards a read response to the processor 541-3. The cache coherence controller also forwards the final response to the remote memory controller associated with non-local nodes 553.

Figure 5D:
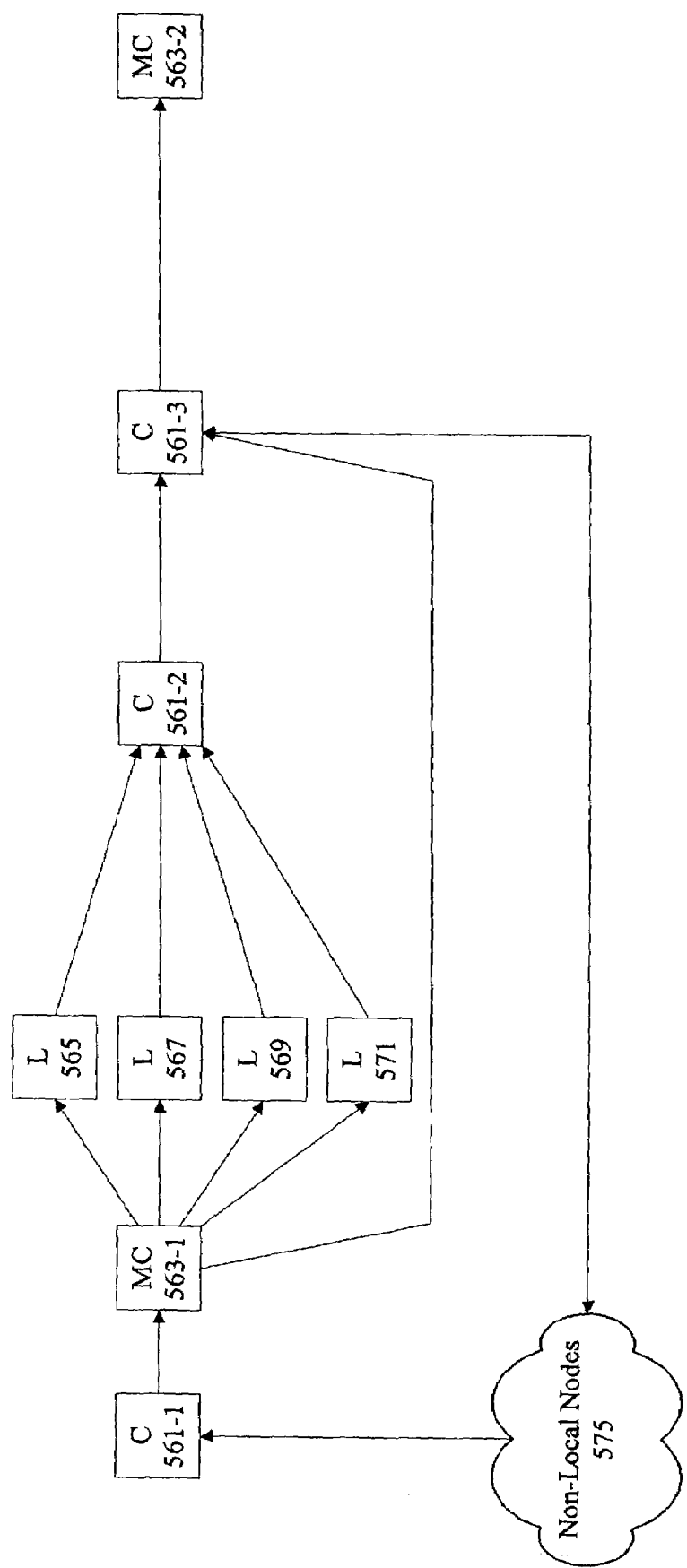

FIG. 5D shows the cache coherence controller acting as a remote processor. When the cache coherence controller 561-1 at a first cluster receives a request from a processor in a second cluster, the cache coherence controller acts as a first cluster processor on behalf of the second cluster processor. The cache coherence controller 561-1 accepts the request from portion 575 and forwards it to a memory controller 563-1. The cache coherence controller 561-2 then accumulates all probe responses as well as the data fetched and forwards the final response to the memory controller 563-2 as well as to non-local nodes 575.

By allowing the cache coherence controller to act as an aggregate remote cache, probing agent pair, remote memory, and remote processor, multiple cluster systems can be built using processors that may not necessarily support multiple clusters. The cache coherence controller can be used to represent non-local nodes in local transactions so that local nodes do not need to be aware of the existence of nodes outside of the local cluster.

Figure 6:
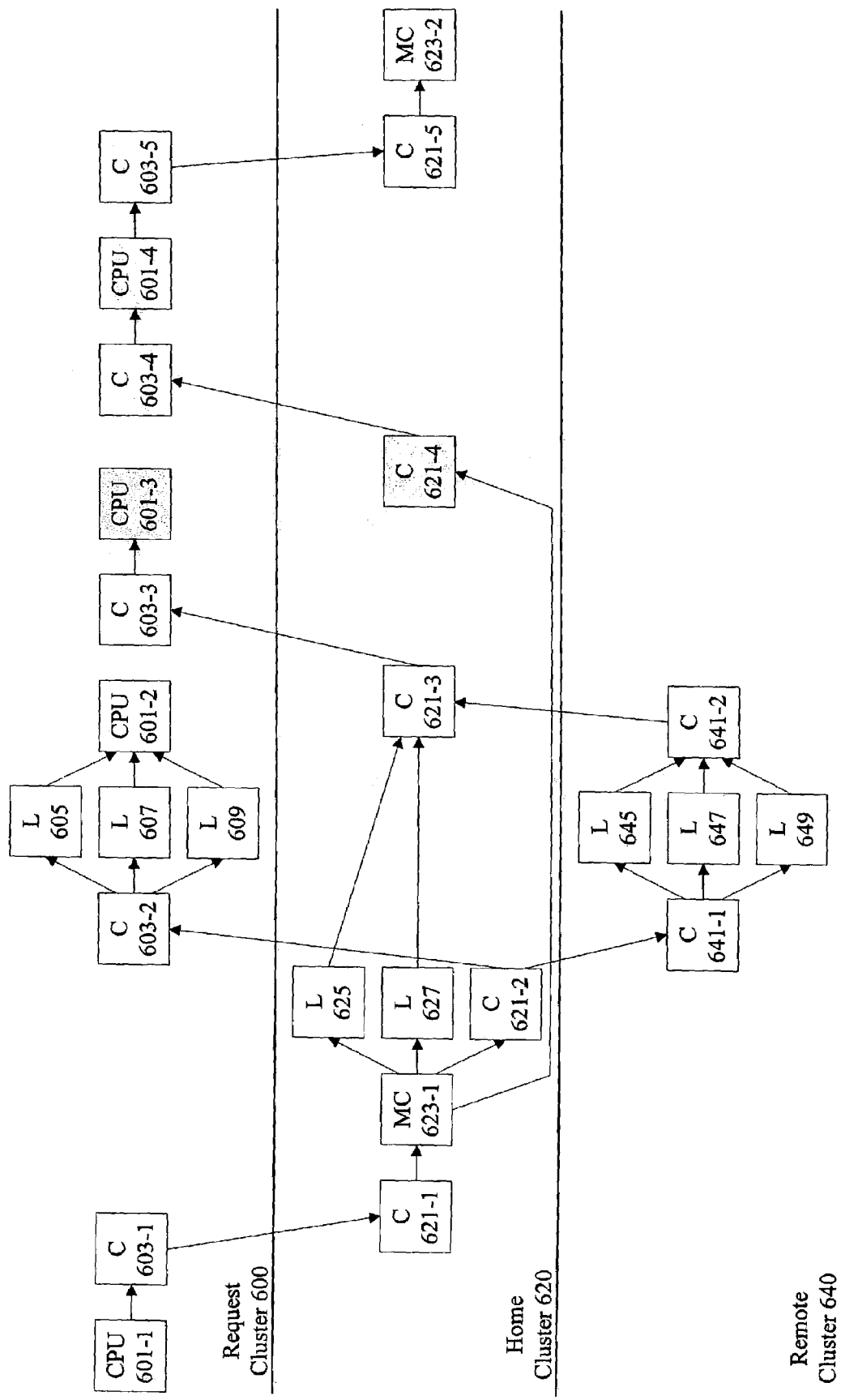
FIG. 6 is a diagrammatic representation depicting a transaction flow for a probe request with multiple probe responses.

FIG. 6 is a diagrammatic representation depicting the transactions for a data request from a local processor sent to a non-local cluster using a cache coherence controller. The multicluster system includes a request cluster 600, a home cluster 620, and a remote cluster 640. As noted above, the home cluster 620 and the remote cluster 640 as well as any other clusters excluding the request cluster 600 are referred to herein as non-local clusters. Processors and cache coherence controllers associated with local and non-local clusters are similarly referred to herein as local processors, local cache coherence controllers, non-local processors, and non-local cache coherence controllers, respectively.

According to various embodiments, processor 601-1 in a local cluster 600 sends a data access request such as a read request to a cache coherence controller 603-1. The cache coherence controller 603-1 tracks the transaction in the pending buffer of FIG. 3 and forwards the request to a cache coherence controller 621-1 in a home cluster 620. The cache coherence controller 621-1 at the home cluster 620 receives the access request and tracks the request in its pending buffer. In one example, information associated with the requests are stored in the pending buffer. The cache coherence controller 621-1 forwards the access request to a memory controller 623-1 also associated with the home cluster 620. At this point, the memory controller 623-1 locks the memory line associated with the request. In one example, the memory line is a unique address in the memory space shared by the multiple processors in the request cluster 600, home cluster 620, and the remote cluster 640. The memory controller 623-1 generates a probe associated with the data access request and forwards the probe to local nodes associated with cache blocks 625 and 627 as well as to cache coherence controller 621-2.

It should be noted that although messages associated with requests, probes, responses, and data are described as forwarded from one node to another, the messages themselves may contain variations. In one example, alterations are made to the messages to allow the multiple cluster architecture to be transparent to various local nodes. It should be noted that write requests can be handled as well. In write requests, the targeted memory controller gathers responses and sends the responses to the processor when gathering is complete.

The cache coherence controller 641-1 associated with the remote cluster 640 receives a probe from cache coherence controller 621-2 and probes local nodes associated with cache blocks 645, 647, and 649. Similarly, the cache coherence controller 603-2 associated with the request cluster 600 receives a probe and forwards the probe to local nodes associated with cache blocks 605, 607, and 609 to probe the cache blocks in the request cluster 600. Processor 601-2 receives probe responses from the local nodes associated with cache blocks 605, 607, and 609.

According to various embodiments, cache coherence controller 621-3 accumulates probe responses and sends the probe responses to cache coherence controller 603-3, which in turn forwards the probe responses to the processor 601-3. Cache coherence controller 621-4 also sends a read response to cache coherence controller 603-4, which forwards the read response to processor 601-4. While probes and probe responses carry information for maintaining cache coherency in the system, read responses can carry actual fetched data. After receiving the fetched data, processor 601-4 may send a source done response to cache coherence controller 603-5. According to various embodiments, the transaction is now complete at the requesting cluster 600. Cache coherence controller 603-5 forwards the source done message to cache coherence controller 621-5. Cache coherence controller 621-5 in turn sends a source done message to memory controller 623-2. Upon receiving the source done message, the memory controller 623-2 can unlock the memory line and the transaction at the home cluster 620 is now complete. Another processor can now access the unlocked memory line.

It should be noted that because the cache coherence controller 621-3 waits for remote cluster probe responses before sending a probe response to cache coherence controller 603-3, delay is introduced into the system. According to various embodiments, probe responses are gathered at cache coherence controller 603-3. By having remote clusters send probe responses through a home cluster, both home cluster probe responses and remote cluster probe responses can be delayed at the home cache coherence controller. In one example, remote cluster probe responses have to travel an additional hop in order to reach a request cluster. The latency for transmission of a probe response between a remote cluster and a request cluster may be substantially less than the latency for transmission of a probe response between a remote cluster and a request cluster through a home cluster. Home cluster probe responses are also delayed as a result of this added hop.

As will be appreciated by one of skill in the art, the specific transaction sequences involving requests, probes, and response messages can vary depending on the specific implementation. In one example, a cache coherence controller 621-3 may wait to receive a read response message from a memory controller 623-1 before transmitting both a probe response message and a read response message to a cache coherence controller 603-3. In other examples, a cache coherence controller may be the actual processor generating the request. Some processors may operate as both a processor and as a cache coherence controller. Furthermore, various data access request messages, probes, and responses associated with reads and writes are contemplated. As noted above, any message for snooping a cache can be referred to as a probe. Similarly, any message for indicating to the memory controller that a memory line should be unlocked can be referred to as a source done message.

It should be noted that the transactions shown in FIG. 6 show examples of cache coherence controllers performing many different functions, including functions of remote processors, aggregate local caches, probing agent pairs, and remote memory as described with reference to FIGS. 5A-5D.

The cache coherence controller 621-1 at the home cluster 620 is acting as a remote processor. When the cache coherence controller receives a request from a request cluster processor, the cache coherence controller is directed to act as the requesting processor on behalf of the request cluster processor. In this case, the cache coherence controller 621-1 accepts a forwarded request from processor 601-1 and sends it to the memory controller 623-1, accumulates responses from all local nodes and the memory controller 623-1, and forwards the accumulated responses and data back to the requesting processor 601-3. The cache coherence controller 621-5 also forwards a source done to the local memory controller 623-2.

The cache coherence controller 603-1 at the request cluster 600 is acting as a remote memory. As remote memory, the cache coherence controller is designed to forward a request from a processor to a proper remote cluster and ensure that local nodes are probed. In this case, the cache coherence controller 603-1 forwards a probe to cache coherence controller 621-1 at a home cluster 620. Cache coherence controller 603-2 also probes local nodes 605, 607, and 609.

The cache coherence controller 641-1 at the request cluster 640 is acting as a probing agent pair. As noted above, when a cache coherence controller acting as a probing agent pair receives a probe from a remote cluster, the cache coherence controller accepts the probe and forwards it to all local nodes. The cache coherence controller accumulates the responses and sends a final response back to the request cluster. Here, the cache coherence controller 641-1 sends a probe to local nodes associated with cache blocks 645, 647, and 649, gathers probe responses and sends the probe responses to cache coherence controller 621-3 at home cluster 620. Similarly, cache coherence controller 603-2 also acts as a probing agent pair at a request cluster 600. The cache coherence controller 603-2 forwards probe requests to local nodes including local nodes associated with cache blocks 605, 607, and 609.

The cache coherence controller 621-2 and 621-3 is also acting as an aggregate remote cache. The cache coherence controller 621-2 is responsible for accepting the probe from the memory controller 623-1 and forwarding the probe to the other processor clusters 600 and 640. More specifically, the cache coherence controller 621-2 forwards the probe to cache coherence controller 603-2 corresponding to request cluster 600 and to cache coherence controller 641-1 corresponding to remote cluster 640. As noted above, using a multiple cluster architecture may introduce delay as well as other undesirable elements such as increased traffic and processing overhead.

Probes are transmitted to all clusters in the multiple cluster system even though not all clusters need to be probed. For example, if a memory line associated with a probe request is invalid or absent from cache, it may not be necessary to probe all of the caches associated with the various clusters. In a system without a coherence directory, it is typically necessary to snoop all clusters. However, by using a coherence directory, the number of transactions in the system can be reduced by probing only a subset of the clusters in a system in order to minimize traffic and processing overhead.

By using a coherence directory, global memory line state information (with respect to each cluster) can be maintained and accessed by a memory controller or a cache coherence controller in a particular cluster. According to various embodiments, the coherence directory tracks and manages the distribution of probes as well as the receipt of responses. If coherence directory information indicates that probing of a specific cluster is not required, the probe to the specific cluster can be eliminated. In one example, a coherence directory indicates that probing of requesting and remote clusters is not necessary. A cache coherence controller in a home cluster probes local nodes without forwarding probes to the request and remote clusters. The cache coherence controller in the home cluster then sends a response to the request cluster after probe responses are received. However, in typical multiple cluster systems, a requesting cluster expects a predetermined number of responses from the various probed clusters. In one example, if the multiple cluster system includes four clusters, a request cluster would expect probe responses associated with nodes in all four clusters.

FIG. 7 is one example of a coherence directory that can be used to allow management and filtering of probes. Various coherence directories are available. In one example, a full directory provides an entry for every memory line in a system. In this example, the coherence directory is maintained at the memory controller and is accessible by a cache coherence controller. However, in a system with a large amount of system memory, a full directory may not be efficient or practical. According to various embodiments, a sparse directory is provided with a limited number of entries associated with a selected set of memory lines. In one example, the coherence directory 701 includes state information 713, dirty data owner information 715, and an occupancy vector 717 associated with the memory lines 711. In some embodiments, the memory line states are modified, owned, shared, and invalid.

In the invalid state, a memory line is not currently cached in cache associated with any remote cluster. In the shared state, a memory line may be present in more than one cache, but the memory line is clean and can not be modified in any of these caches. When a memory line is in the shared state, an occupancy vector 717 can be checked to determine what caches share the relevant data. An occupancy vector 717 may be implemented as an N-bit string, where each bit represents the availability of the data in the cache of N clusters. Any mechanism for tracking what clusters hold a copy of the relevant memory line in cache is referred to herein as an occupancy vector. The memory line with address 741 is in the shared state, and the occupancy vector 717 indicates that clusters 1 and 3 each have a copy of the shared memory line in cache.

In the modified state, a memory line has been modified and the modified copy exists in cache associated with a particular cluster. When a memory line is modified, dirty data owner information field 715 can be checked to determine the owner of the dirty data. Any mechanism for indicating what cluster owns a modified copy of the memory line in cache is referred to herein as a dirty data owner information field. In one example, the memory line associated with address 781 is modified, and the dirty data owner field 715 indicates that cluster 2 owns the memory line.

In the owned state, a dirty memory line is owned by a single cache but may be held shared in multiple other caches. It has been modified by the owning cache, but is now read-only. In this case, the copy held in memory is stale. If the memory line is in the owned state, dirty data owner field 715 can be accessed to determine which cluster owns the dirty data. In one example, the memory line associated with address 761 is in the owned state and is owned by cluster 4.

The occupancy vector 717 can also be checked to determine what other caches may have the relevant data. In this example, the occupancy vector 717 indicates that clusters 2, 3, and 4 each have a copy of the data associated with the memory line in cache.

Although the coherence directory 701 includes the four states of modified, owned, shared, and invalid, it should be noted that particular implementations may use a different set of states. In one example, a system may have the five states of modified, exclusive, owned, shared, and invalid. In the exclusive state, a memory line may be accessible to a particular node in a remote cluster, but the node in the remote cluster has not yet written data to the cache line. The techniques of the present invention can be used with a variety of different possible memory line states.

When a processor in a request cluster performs a transaction such as a read request on a particular memory line, the processor accesses an associated cache. In many implementations, each processor in a particular cluster has an associated cache. If the memory line is not available in cache, the request is forwarded to a home cluster through a cache coherence controller. In one embodiment, the home cluster is the cluster of processors having the address space including the memory line of the request. The cache coherence controller can then access the coherence directory to determine what clusters should be probed to meet the request. The coherence directory allows a reduction of the number of probes transmitted between clusters.

Mechanisms for reducing the number of transactions in a system by accessing a coherence directory are described in U.S. patent application Ser. Nos. 10/288,399 and 10/288,347 by David B. Glasco, both titled Methods and Apparatus for Managing Probe Requests on the filing date Nov. 4, 2002, the entireties of which are incorporated by reference for all purposes. By reducing the number of inter cluster transactions, system efficiencies are improved as bandwidth is preserved and transaction latency is reduced. The coherence directory provides one mechanism for reducing intercluster transactions. According to various embodiments, a remote data cache is another mechanism for reducing intercluster transactions.

According to various embodiments, another level of caching is provided in each cluster so that if the cache associated with each processor does not hold a request in memory line, the cache associated with the cluster may be checked before forwarding a probe to a home cluster. In one example, a remote data cache is included in each cluster and accessible by the cache coherence controller of each cluster. Unlike the caches associated with each processor, in this example a single remote data cache is provided for multiple processors in a cluster. If a memory line requested by a particular processor is not found in the cache associated with the processor, a cache coherence controller does not necessarily need to forward the request to a home cluster. Instead the cache coherence controller can check the remote data cache to determine if the memory line is resident in the remote data cache. If the memory line is resident in the remote data cache, no probe needs to be forwarded to the home cluster and the cache coherence controller can instead use the data in the remote data cache to respond to the transaction.

By using the techniques of the present invention, the remote data cache can respond to requests such as read block, read block shared, and read block modified without forwarding the request to a home cluster.

FIG. 8 is a diagrammatic representation of a remote data cache. The remote data cache allows a cache coherence controller to efficiently handle certain types of transactions locally without having to forward probes to remote clusters. Any cache holding data from remote clusters accessed by local processors that is accessed after local caches but before a home cluster memory controller is referred to herein as a remote data cache. In one example, a remote data cache is accessed by a cache coherence controller before a request such as a read, read block shared, or read block modified request is forwarded to a home cluster. A remote data cache allows a transaction to be handled in a local cluster without having to forward probes to remote clusters.

According to various embodiments, a remote data cache 801 includes a memory line field 811. The addresses of various memory lines are provided in this field to allow efficient access by a cache coherence controller to determine if a particular memory line is resident in the remote data cache. Entries are typically added to the remote data cache when memory lines are evicted from processor cache. The remote data cache 801 also includes state information 813 and the actual cached data 815. In one example, address 821 has a state of invalid and no associated cache data. It should be noted in that in typical instances, a memory line in the invalid state would simply not be included in the remote data cache. Address 841 includes data 843 held in the shared state. In one example, data held in the shared state in the remote data cache can be used to satisfy read block and read block shared requests without forwarding the request to the home cluster. Address 861 has data 863 held in the owned state. According to various embodiments, data held in the owned state can also be used to satisfy read block and read block shared transactions.

It should be noted that in some instances, no data can be held in the remote data cache 801 in the modified state. For systems with remote data caching, the remote data cache can be used to cache data from remote clusters. In such systems, the standard MEOSI cache coherence protocol is typically employed. In such a protocol, the local processor caches may evict a memory line from the cache and if the line is dirty (modified or owned state), the data is written back to memory. The remote data cache, which sits between the processor cache and system memory, will observe the write back, but does not have enough information to determine how to install the line into the remote data cache. A typical processor cache does have this information.

However, the remote data cache is associated with a cache coherence controller. In some instances, the cache coherence controller does not have information about whether a line being evicted from a processor cache was in a modified or owned state. The remote data cache consequently takes a conservative approach and installs the memory line in an owned state even though the memory line maybe could have been installed in a modified state. In the same manner, the remote data cache sometimes conservatively installs a memory line in a shared state even though the memory line maybe could have been installed in an exclusive state. By taking the conservative approach, transactions such as read block modified that could be handled if the memory line were known to be in an exclusive or modified state, can not be handled by the remote data cache and consequently are forwarded to the home cluster. Forwarding to the home cluster uses system resources that do not necessarily have to be used.

The techniques of the present invention provide several mechanisms for allowing a remote data cache to install memory lines not only in the shared and owned states, but also in the exclusive and modified states. In one example, the modified or owned state information used to install a memory line into the remote data cache is obtained from a coherence directory. In another example, the state information is obtained from an augmented source done message from a processor.

The techniques of the present invention not only allow all data in the remote data cache to be held in the shared or owned states, but also provide mechanisms for holding data in the modified and exclusive states. Data in the remote data cache held in the modified or exclusive states can satisfy read block, read block shared, and read block modified transactions.

It should be noted that the remote data cache 801 also holds information in the pending state. The pending state is used to hold data that is initially entered into the remote data cache but not yet confirmed by a source done. Data held in the pending state may be invalidated by a probe received by the processor after the data is initially written to the remote data cache but before the final response transaction is received.

Figure 9:
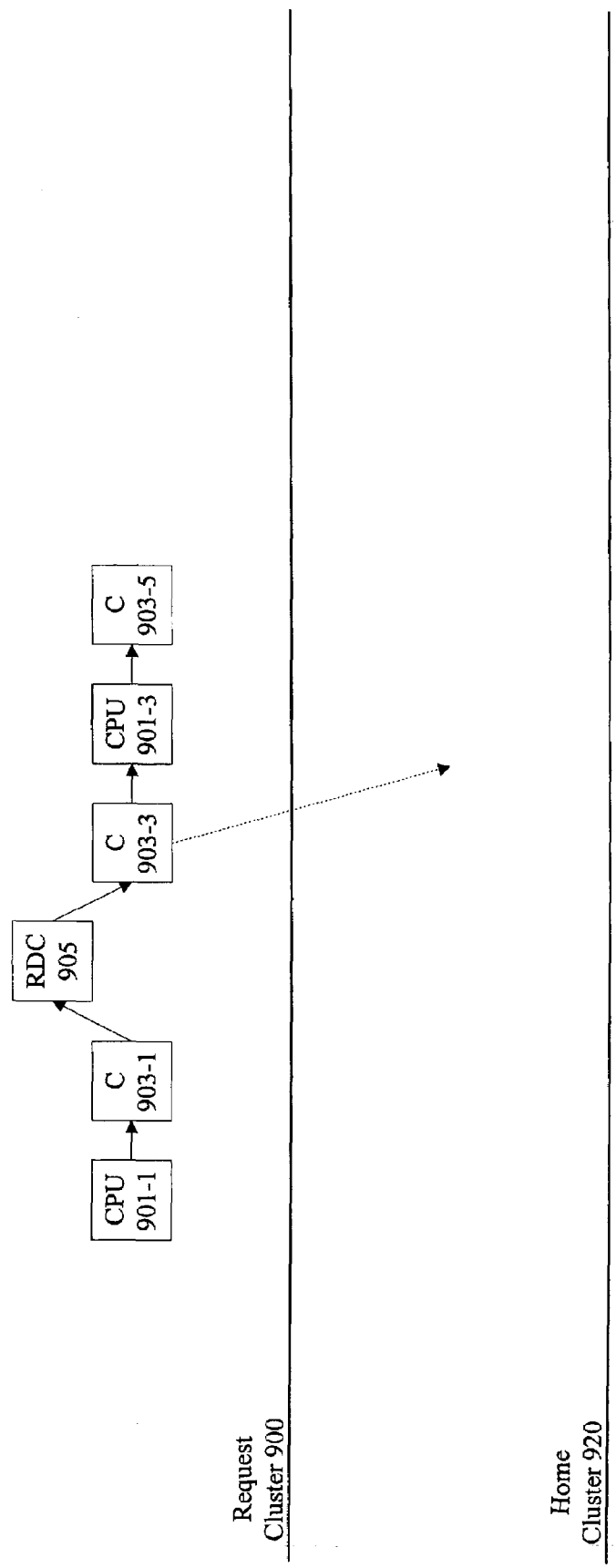
FIG. 9 is a diagrammatic representation depicting a transaction flow using a remote data cache.

FIG. 9 is a diagrammatic representation showing a transaction flow where a remote data cache can be used. According to various embodiments, a processor 901-1 in a request cluster 900 sends a data access request such as a read request to a cache coherence controller 903-1. The cache coherence controller 903-1 tracks the transaction in the pending buffer and determines whether the request can be handled locally using remote data cache 905. According to various embodiments, if the request is a read block or read block shared for a particular memory line, the request can be handled locally if the memory line is held in the remote data cache in any of the modified, owned, exclusive, or shared states. In other words, the request can be handled locally if a valid copy of the memory line is in the remote data cache. However, if the request is a transaction such as read block modified, the request can be handled locally only if the memory line is held in the remote data cache in the modified or exclusive state. If the request can be handled locally, the remote data cache provides information to the cache coherence controller 903-3 which sends a data response to the processor 901-3. However, if the request cannot be handled locally, the cache coherence controller 903-3 forwards the request to a home cluster 920.

Once the remote data cache determines that it can satisfy a request, it locks the line and blocks all incoming probe requests until the transaction completes. The remote data cache effectively creates a temporary serialization point at the remote data cache for the memory line—locking the line until the transaction completes as the memory controller does.

Figure 10:
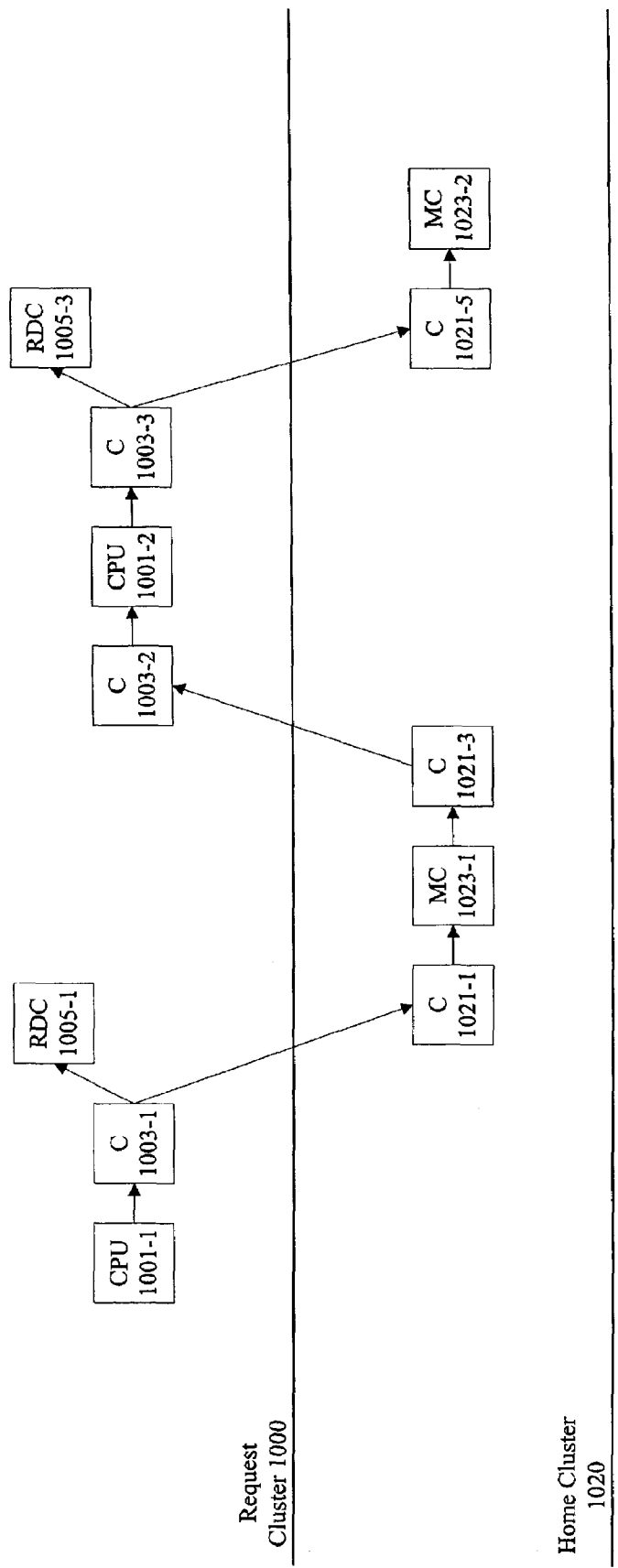
FIG. 10 is a diagrammatic representation depicting a transaction flow for updating a remote data cache with write back to memory.
Figure 11:
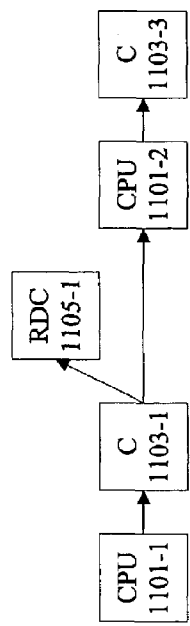
FIG. 11 is a diagrammatic representation depicting a transaction flow for updating a remote data cache without write back to memory.

FIG. 9 shows a transaction flow where entries in a remote data cache are used to reduce the number of transactions in a system. FIGS. 10 and 11 are diagrammatic representations showing transaction flows where entries are installed in a remote data cache. FIG. 10 shows transactions where an entry is added to a remote data cache and the data is written back to system memory. FIG. 11 shows transactions where an entry is added to a remote data cache without writing the data to system memory.

Referring to FIG. 10, a processor 1001-1 in a request cluster 1000 sends a write back transaction to a cache coherence controller 1003-1. A write back is typically generated when a memory line is evicted from the cache associated with the processor. The cache coherence controller 1003-1 writes the data into the remote data cache 1005-1 in the pending state and forwards the write back to the home cluster. The cache coherence controller 1021-1 in the home cluster 1020 forwards the write back to the memory controller 1023-1 which writes the data into system memory.

The memory controller 1023-1 then sends a done message to the cache coherence controller 1021-3, which forwards the done message to the request cluster 1000 processor 1001-2 through cache coherence controller 1003-2. The processor 1001-2 sends a source done message to the cache coherence controller 1003-3. The source done message typically includes an indicator noting if the memory line was invalidated by an intervening probe. If the source done indicates that the line was invalidated, the memory line is removed from the remote data cache or placed in the invalid state. If the line was not invalidated, the state of the entry in the remote data cache is conservatively updated to shared. The source done is then forwarded to the home cluster memory controller 1023-2 through cache coherence controllers 1003-3 and 1021-5.

FIG. 10 shows a situation where data is written back to memory. In some circumstances, data does not necessarily have to be written back to memory. In one example, eviction of a memory line in the owned state leads to installation of the memory line in the remote data cache in the owned state. In this particular case, the remote data cache does not hold dirty data. This allows the remote data cache to silently evict the entry.

FIG. 11 is a diagrammatic representation showing a transaction flow for installing a memory line in the remote data cache without writing the memory line back to memory. A processor 1101-1 sends a write back to cache coherence controller 1103-1. The memory line is installed in remote data cache 1105-1 and is available for use. A done message is send to the processor 1101-2 which in turns sends a source done to cache coherence controller 1103-3. In this case, the remote data cache may hold dirty data that is written back to memory if the entry is evicted from the remote data cache.

Figure 12:
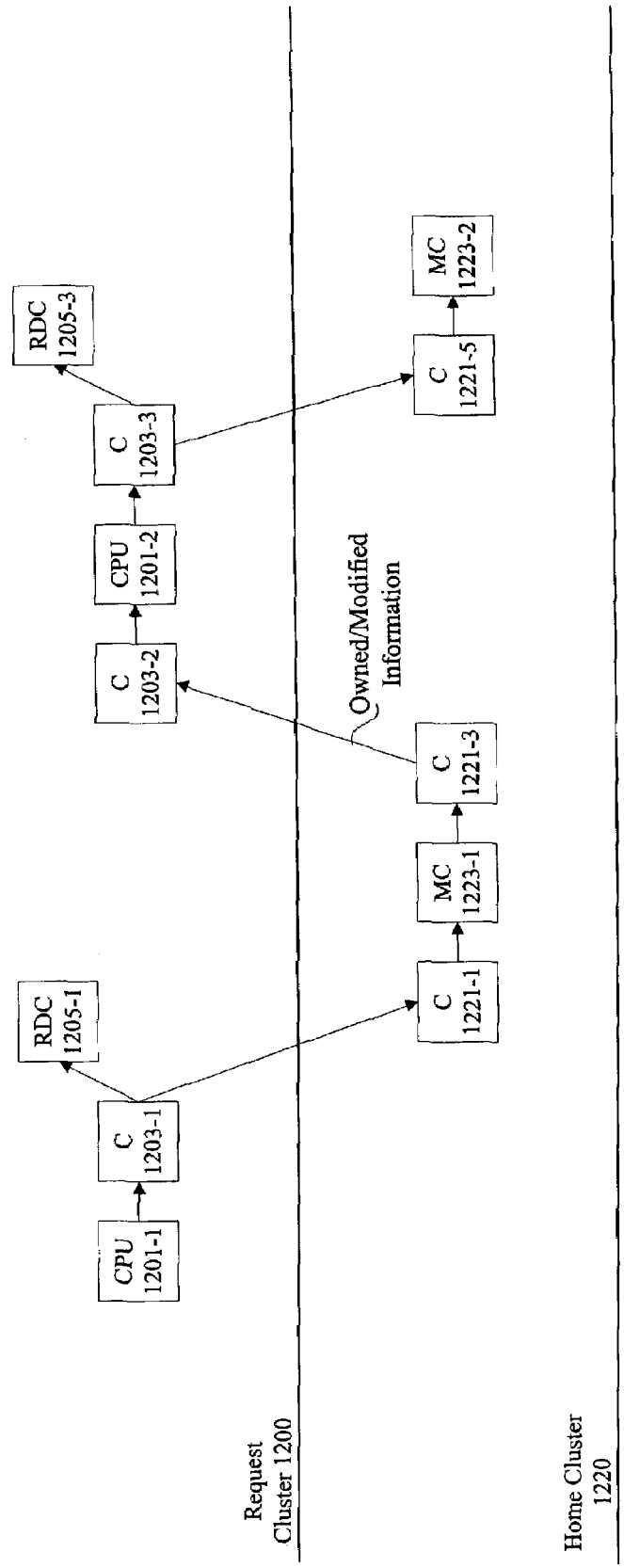
FIG. 12 is a diagrammatic representation depicting a transaction flow for updating a remote data cache using a coherence directory.

FIG. 12 is a diagrammatic representation showing a transaction flow for a write back where a coherence directory provides state information. According to various embodiments, a remote data cache does not know whether a memory line being written back is in the owned or modified state and consequently has to conservatively assume that it is in the owned state. The techniques of the present invention allow a home cluster to provide information about whether the memory line was in the owned or modified state to the remote data cache. A processor 1201-1 in a request cluster 1200 sends a write back to a cache coherence controller 1203-1. The data is written to the remote data cache 1205-1 in a pending state. The cache coherence controller 1203-1 also forwards the write back to memory controller 1223-1 through cache coherence controller 1221-1 in home cluster 1220.

The memory controller 1223-1 writes the memory line back to system memory and sends a done message to cache coherence controller 1221-3. The cache coherence controller 1221-3 obtains state information from a coherence directory and sends the state information in a done message to the cache coherence controller 1203-2. According to various embodiments, the state information is sent in the form of an owned/modified bit that indicates whether the memory line was held in the owned or modified state. The cache coherence controller 1203-2 writes the state information into its pending buffer and sends a done message to the processor 1201-2. The processor 1201-2 sends a source done message to cache coherence controller 1203-3. The state of the memory line in the remote data cache 1205-3 can now be converted from pending to whatever state was provided by the owned/modified bit. The source done is forwarded to memory controller 1223-2 through cache coherence controller 1221-5.

Figure 13:
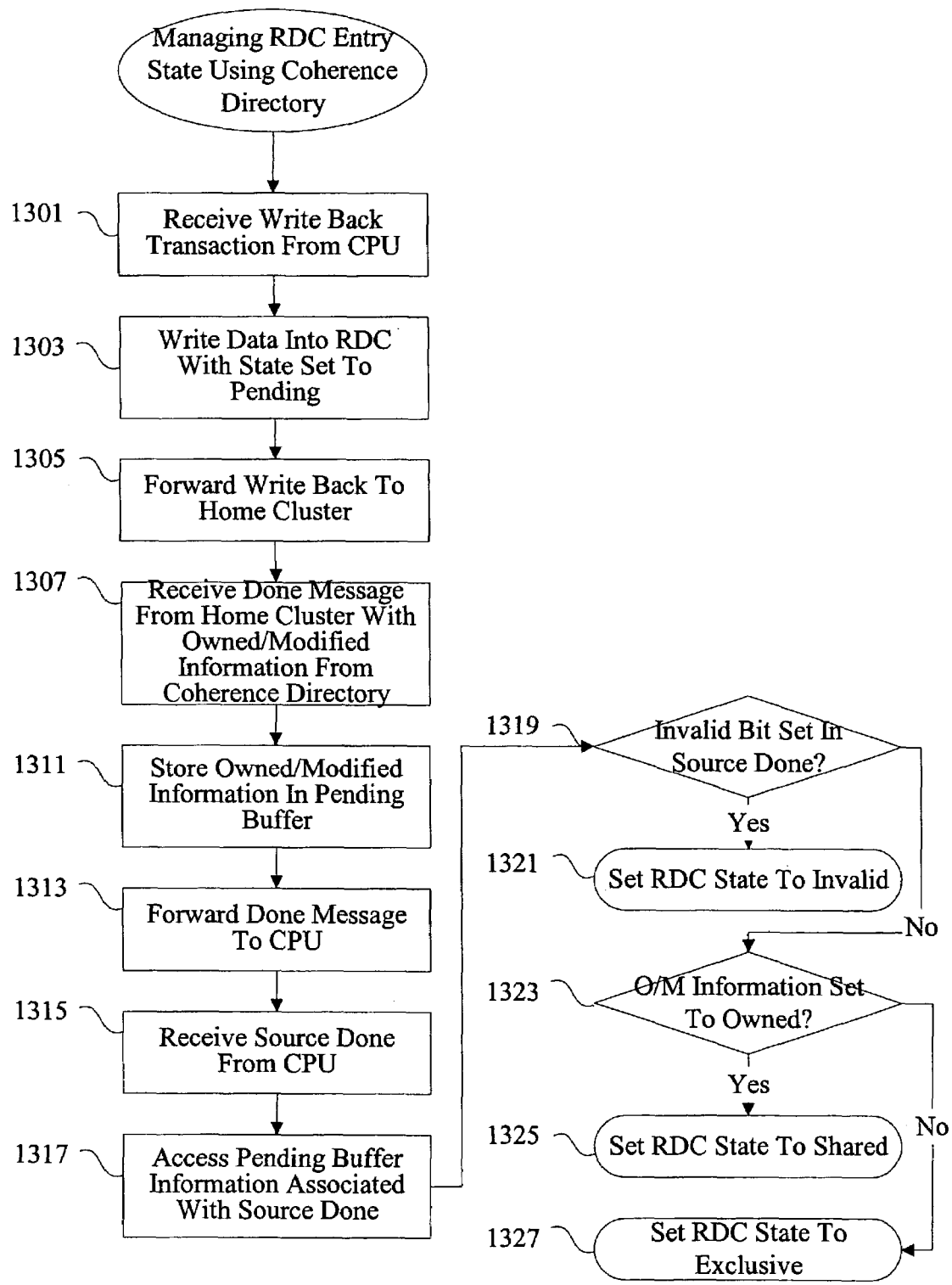
FIG. 13 is a flow process diagram showing a remote data cache update using a coherence directory.

FIG. 13 is a flow process diagram showing management of a remote data cache using a coherence directory. At 1301 a write back transaction is received from a processor. In some examples, the write back is generated as the result of the eviction of a dirty memory line. At 1303, data is written into the remote data cache with the state set to pending. The pending state accounts for intervening invalidating transactions that may occur before a source done is sent by the processor. At 1305, the write back is forwarded to the home cluster. It should be noted that the write back is forwarded to the home cluster when the data is actually written back to memory. At 1307, the done message is received from the home cluster with owned or modified state information retrieved from a coherence directory of the home cluster. At 1311, the owned or modified information is stored in a pending buffer. At 1313, the done message is forwarded to a processor. At 1315, a source done message is received from the processor. At this point, the pending buffer can be accessed for state information associated with the memory line at 1317.

The source done message is also checked to determine if the invalid bit is set. The invalid bit is used to signal the memory controller that the writeback data is invalid, as it was over written after the writeback was generated but before the data was committed at the memory controller. If the invalid bit is set in the source done at 1319, the remote data cache state is set to invalid at 1321. In some examples, the data is removed from the remote data cache. If the invalid bit is not set at 1319, it is determined if the memory line was held in the owned state at 1323. If the memory line was held in the owned state as indicated by the owned or modified information from the coherence directory, the remote data cache state is set to shared at 1325. If the owned or modified information is set to modified at 1323, the remote data cache state for the memory line is set to exclusive at 1327. By providing owned or modified information, the techniques of the present invention allow a remote data cache state can be set to exclusive. By setting the remote data cache state to exclusive, more transactions including read block modified can be handled in a request cluster.

Figure 14:
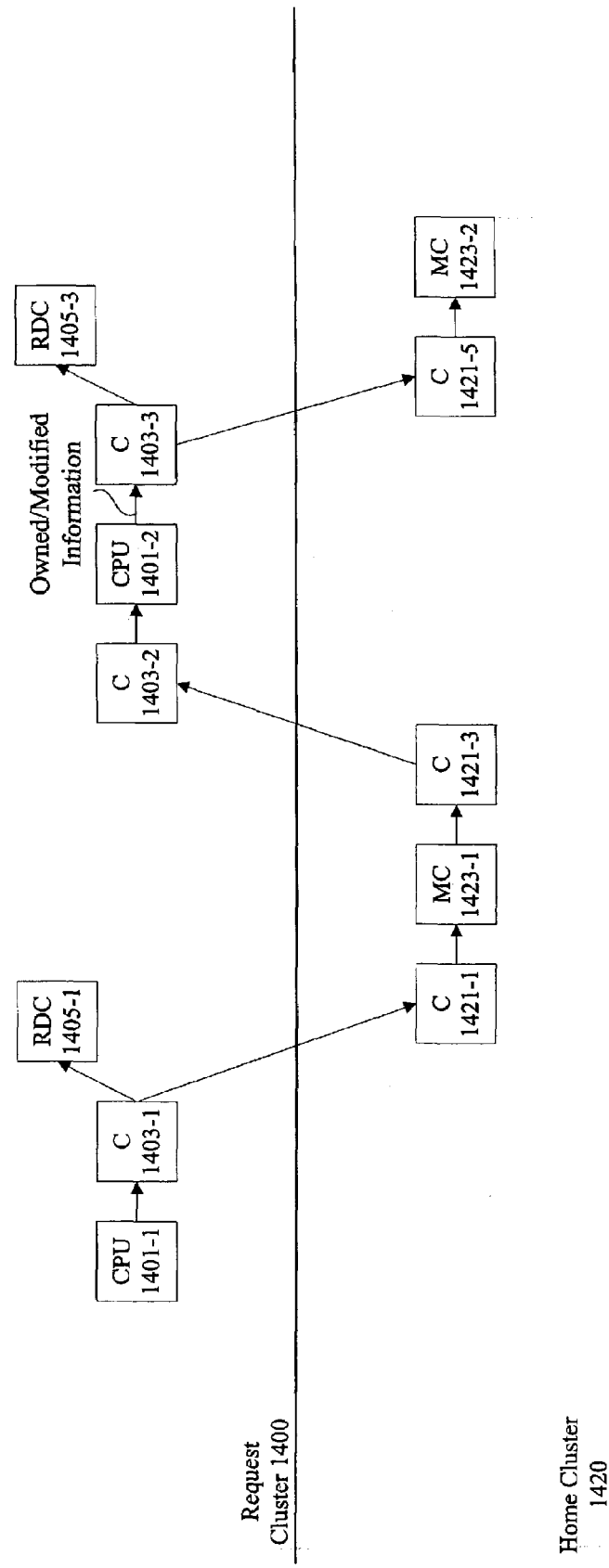
FIG. 14 is a diagrammatic representation depicting a transaction flow for updating a remote data cache using augmented source done information.

FIG. 14 is a diagrammatic representation showing a transaction flow for a write back where a processor provides an augmented source done. A processor 1401-1 in a request cluster 1400 sends a write back to a cache coherence controller 1403-1. The data is written to the remote data cache 1405-1 in a pending state. The cache coherence controller 1403-1 also forwards the write back to memory controller 1423-1 through cache coherence controller 1421-1 in home cluster 1420.

The memory controller 1423-1 writes the memory line back to system memory and sends a done message to cache coherence controller 1421-3. The cache coherence controller 1421-3 sends a done message to the cache coherence controller 1403-2. The cache coherence controller 1403-2 sends a done message to the processor 1401-2. The processor 1401-2 sends an augmented source done message to cache coherence controller 1403-3. Any message sent from a processor to a memory controller indicating that a transaction is complete and providing information on whether a memory line was in the owned or modified state is referred to herein as an augmented source done message. According to various embodiments, the augmented source done message includes an owned/modified bit that indicates whether the state of the memory line was owned or modified in the processor cache prior to the eviction. The state of the memory line in the remote data cache 1405-3 can now be converted from pending to whatever state was provided by the owned/modified bit. The source done is forwarded to memory controller 1423-2 through cache coherence controller 1421-5. It should be noted that because a coherence directory is not needed, an augmented source done can be used to provide owned/modified information even when data is not written back to the home cluster.

Figure 15:
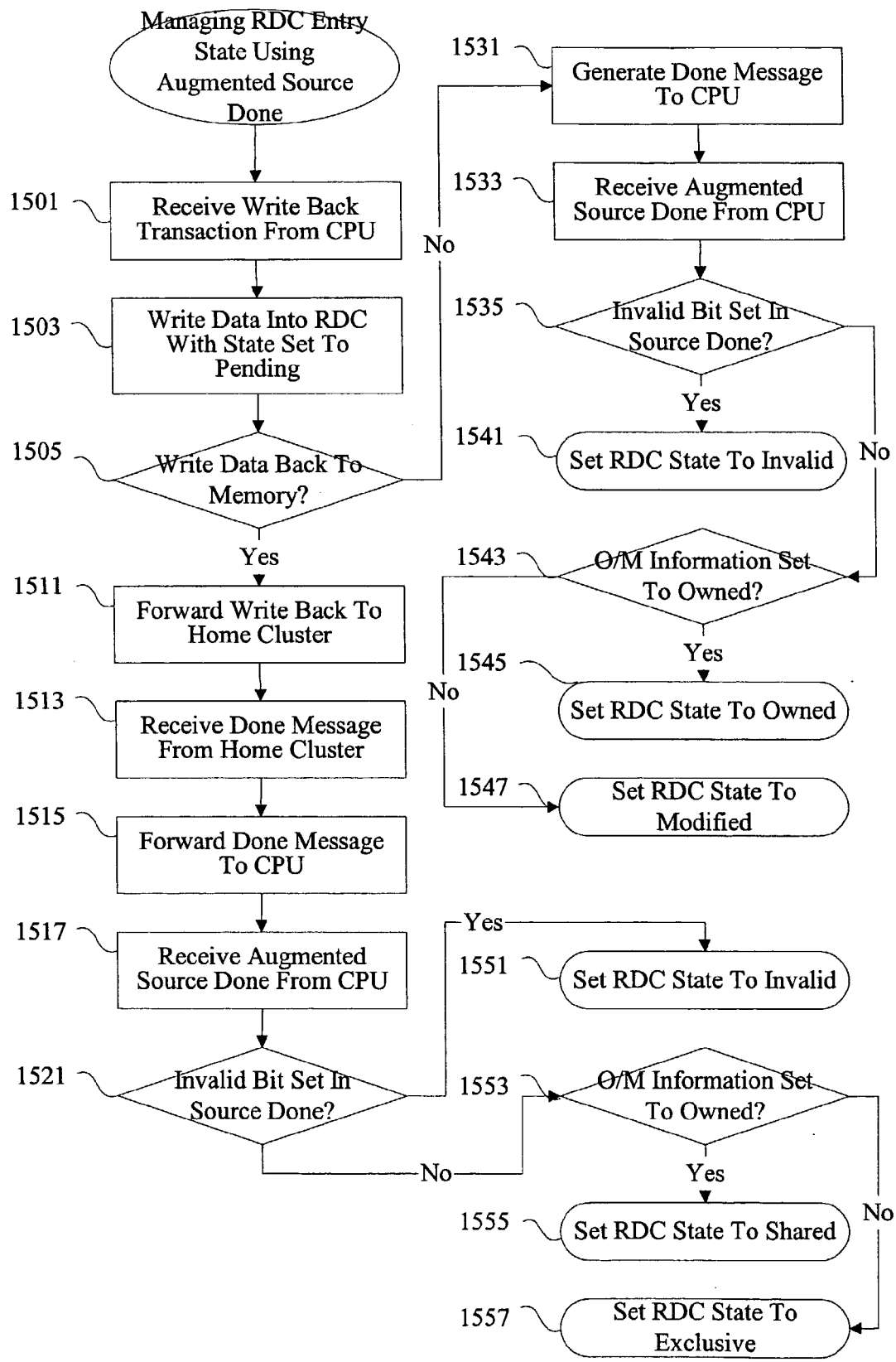
FIG. 15 is a flow process diagram showing a remote data cache update using augmented source done information.

FIG. 15 is a flow process diagram showing management of a remote data cache using augmented source done information. At 1501, a write back transaction is received from a processor. At 1503, the data is written into the remote data cache with the state set to pending. At 1505, it is determined if the data will be written back to memory. If the data is written back to memory at 1505, the write back is forwarded to the home cluster at 1511. The done message is in received from the home cluster at 1513. The done message is forwarded to the processor at 1515 and an augmented source done is received from a processor at 1517.

It is determined from the augmented source done whether the invalid bit was set at 1521. If the invalid bit was set, the remote data cache state is set to invalid at 1551. Otherwise, it is determined if the owned or modified bit with set owned at 1553. If the owned or modified bit was set to owned, the remote data cache state is set to shared at 1555. If the owned or modified bit with set to modified, the remote data cache state is set to exclusive at 1557. Managing a remote data cache entry using augmented source done information also allows effective management even when data is not written back to memory. In one example, if an owned or modified memory line is evicted, a write back is necessary at 1505. In another example, if a shared or exclusive memory line is evicted, no write back is necessary at 1505. However, the remote data cache may have some other mechanisms for writing back to memory at a later time. If no write back is needed, a done message is sent to the processor at 1531. At 1533, an augmented source done is received from a processor. At 1535, it is determined if the invalid bit was set in the augmented source done. If the invalid bit was set, the remote data cache state is set to invalid at 1541. Otherwise, it is determined if the owned or modified bit was set to owned. If the owned or modified bit was set to owned at 1543, the remote data cache state is set to owned. If the owned or modified information was set to modified, the remote data cache state is set to modified at 1547.

Data can be loaded into a remote data cache in a variety of ways. In one example noted above, data is loaded when a cache line is evicted from processor cache. However, data can also be loaded in other ways. For example, data can be loaded in the remote data cache on a data response from the memory controller to a read block. In this case, the line is installed into the remote data cache in a shared state. For example, in FIG. 6, when the data response from the memory controller is received at the requesting cluster's cache coherence controller 603-4, the data can also be sent to the remote data cache in addition to processor 601-4.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with multiple processor clusters connected through a point-to-point, switch, or bus architecture. In another example, multiple clusters of processors may share a single cache coherence controller, or multiple cache coherence controllers can be used in a single cluster.

Therefore, the scope of the invention should be determined with reference to the appended claims.

What is claimed is:

1. A computer system, comprising:
   a request cluster including a first plurality of nodes and a request cache coherence controller, the first plurality of nodes having a first plurality of processors and a first plurality of caches associated with the first plurality of processors, the request cache coherence controller associated with a remote data cache, wherein the remote data cache includes data in memory lines of remote clusters, wherein data is written to the remote data cache in a pending state after the cache coherence controller receives a write back from one of the first plurality of processors;
   a home cluster including a second plurality of processors and a request cache coherence controller, the second plurality of processors interconnected in a point-to-point architecture.

2. The computer system of claim 1, wherein nonrequest clusters comprise the home cluster and one or more remote clusters.

3. The computer system of claim 1, wherein the remote data cache is used to cache memory lines associated with remote clusters when memory lines holding data and are evicted from the first plurality of caches.

4. The computer system of claim 1, wherein a writeback is generated when memory lines holding dirty data are evicted from the first plurality of caches.

5. The computer system of claim 4, wherein memory lines hold dirty data when the memory lines are held in a modified or owned state.

6. The computer system of claim 4, wherein evicting a memory lines comprises writing dirty data back to memory.

7. The computer system of claim 1, wherein a plurality of remote data caches are associated with a plurality of cache coherence controllers in the computer system.

8. The computer system of claim 1, wherein data can be held in the remote data cache in states of modified, exclusive, owned, shared, and invalid.

9. The computer system of claim 1, wherein data is written to the remote data cache in the invalid state after a source done is received from one of the first plurality of processors if the source done indicates that the memory line was invalidated.

10. The computer system of claim 1, wherein data is written to the remote data cache in the modified, exclusive, owned, or shared state after a source done is received from one of the first plurality of processors if the source done indicates that the memory line was not invalidated.

11. The computer system of claim 1, wherein the request cache coherence controller receives information indicating whether the memory line was held in a shared or owned state from the home cluster.

12. The computer system of claim 1, wherein data is written to the remote data cache in the shared state after the home cluster responds to a read block request.

13. A method for maintaining coherency, the method comprising:
   receiving a write back at a request cache coherence controller from a request cluster processor, the write back associated with a memory line evicted from a cache corresponding to the request cluster processor;
   writing data associated with the memory line into a remote data cache, wherein the remote data cache includes data in memory lines in the address space of remote clusters;
   receiving information indicating whether the memory line was held in a modified or owned state.

14. The method of claim 13, wherein information indicating whether the memory line was held in the modified or owned state is received from a home cluster cache coherence controller having a coherence directory.

15. The method of claim 13, wherein information indicating whether the memory line was held in the modified or owned state is received from the request cluster processor.

16. The method of claim 13, wherein information indicating whether the memory line was held in the modified or owned state is received from the request cluster processor in a source done message.

17. The method of claim 13, further comprising receiving information indicating whether the memory line was invalidated by an intervening request.

18. The method of claim 17, wherein if the memory line was invalidated by an intervening request, the state of the memory line in the remote data cache is set to invalid.

19. The method of claim 18, wherein if the memory line was not invalidated, the state of the memory line in the remote data cache is set to shared or exclusive.

20. The method of claim 19, wherein the state of the memory line in the remote data cache is set to shared if the memory line was held in the owned state prior to receipt of the write back.

21. The method of claim 19, wherein the state of the memory line in the remote data cache is set to exclusive if the memory line was held in the modified state prior to receipt of the write back.

22. A computer system, comprising:
   a request cluster including a first plurality of nodes and a request cache coherence controller, the first plurality of nodes having a first plurality of processors and a first plurality of caches associated with the first plurality of processors, the request cache coherence controller associated with a remote data cache, wherein the remote data cache includes data in memory lines of remote clusters;
   a home cluster including a second plurality of processors and a request cache coherence controller, the second plurality of processors interconnected in a point-to-point architecture;
   wherein the first plurality of processors are operable to send information to the request cache coherence controller indicating whether a cache line is owned or modified in order to modify an entry in the remote data cache.

23. The computer system of claim 22, wherein the first plurality of processors are further operable to send information to the request cache coherence controller indicating whether the cache line is invalid.

24. The computer system of claim 22, wherein nonrequest clusters comprise the home cluster and one or more remote clusters.

25. The computer system of claim 22, wherein the remote data cache is used to cache memory lines associated with nonrequest clusters when memory lines holding data are evicted from the first plurality of caches.

26. The computer system of claim 22, wherein information indicating whether a cache line is owned or modified is sent when a cache line is evicted.

27. The computer system of claim 26, wherein evicting a cache line comprises writing data back to memory.

28. The computer system of claim 22, wherein a plurality of remote data caches are associated with a plurality of cache coherence controllers in the computer system.

29. The computer system of claim 22, wherein data can be held in the remote data cache in states of modified, exclusive, owned, shared, and invalid.

30. The computer system of claim 29, wherein data can further be held in a state of pending.

31. The computer system of claim 30, wherein data is written to the remote data cache in the pending state after the cache coherence controller receives a write back from one of the first plurality of processors.

32. A computer system, comprising:
   means for receiving a write back at a request cache coherence controller from a request cluster processor, the write back associated with a memory line evicted from a cache corresponding to the request cluster processor;
   means for writing data associated with the memory line into a remote data cache, wherein the remote data cache includes data in memory lines in the address space of remote clusters;
   means for receiving information indicating whether the memory line was held in a modified or owned state.

33. The computer system of claim 32, wherein information indicating whether the memory line was held in the modified or owned state is received from a home cluster cache coherence controller having a coherence directory.

34. The computer system of claim 32, wherein information indicating whether the memory line was held in the modified or owned state is received from the request cluster processor.

35. The computer system of claim 32, wherein information indicating whether the memory line was held in the modified or owned state is received from the request cluster processor in a source done message.

36. The computer system of claim 32, further comprising receiving information indicating whether the memory line was invalidated by an intervening request.

37. The computer system of claim 36, wherein if the memory line was invalidated by an intervening request, the state of the memory line in the remote data cache is set to invalid.

* * * * *